(12) United States Patent
Frankel et al.

(10) Patent No.: US 11,734,538 B1
(45) Date of Patent: Aug. 22, 2023

(54) LOW POWER RADIO DEVICES AND SYSTEMS

(71) Applicant: David Trandal, Santa Barbara, CA (US)

(72) Inventors: Robert E. Frankel, Goleta, CA (US); Paul Garrity, Rockwall, TX (US); Devin Murphy, Austin, TX (US)

(*) Notice: Subject to any disclaimer, the term of this patent is extended or adjusted under 35 U.S.C. 154(b) by 221 days.

(21) Appl. No.: 17/351,508

(22) Filed: Jun. 18, 2021

Related U.S. Application Data

(60) Provisional application No. 63/043,044, filed on Jun. 23, 2020.

(51) Int. Cl.
*G08B 21/00* (2006.01)
*G06K 19/07* (2006.01)
*H04W 52/02* (2009.01)

(52) U.S. Cl.
CPC ..... *G06K 19/0707* (2013.01); *G06K 19/0705* (2013.01); *G06K 19/0724* (2013.01); *G06K 19/0726* (2013.01); *H04W 52/0235* (2013.01); *H04W 52/0254* (2013.01)

(58) Field of Classification Search
CPC .......... G06K 19/0707; G06K 19/0705; G06K 19/0724; G06K 19/0726; H04W 52/0235; H04W 52/0254
See application file for complete search history.

(56) References Cited

U.S. PATENT DOCUMENTS

| | | | |
|---|---|---|---|
| 10,547,727 B2 | 1/2020 | Garrity | |
| 2006/0238308 A1* | 10/2006 | Mickle | G06K 19/0723 340/10.33 |
| 2007/0096875 A1* | 5/2007 | Waterhouse | G06K 19/07749 340/572.1 |
| 2008/0180248 A1* | 7/2008 | Lian | G06K 7/10128 340/572.1 |
| 2009/0117872 A1* | 5/2009 | Jorgenson | G06K 19/07749 455/334 |
| 2018/0014273 A1* | 1/2018 | Su | H04L 5/0055 |

* cited by examiner

*Primary Examiner* — Mark S Rushing

(57) ABSTRACT

Systems and methods are described for low power radio devices. A first radio-based computing devices emits wireless power signals which are received by a plurality of second radio-based devices. A sensor controller of the one or more second radio-based devices determines if an interrupt signal is to be transmitted to an associated at rest microcontroller, to cause the microcontroller to prepare to receive or emit a radio information signal.

20 Claims, 14 Drawing Sheets

LOW POWER RADIO DEVICES AND SYSTEMS

COPYRIGHT RIGHTS

A portion of the disclosure of this patent document contains material that is subject to copyright protection. The copyright owner has no objection to the reproduction by any one of the patent document or the patent disclosure, as it appears in the patent and trademark office patent file or records, but otherwise reserves all copyright rights whatsoever.

INCORPORATION BY REFERENCE TO ANY PRIORITY APPLICATIONS

Any and all applications for which a foreign or domestic priority claim is identified in the Application Data Sheet as filed with the present application, are hereby incorporated by reference in their entirety under 37 CFR 1.57.

FIELD OF THE INVENTION

This invention relates to general radio-based devices, more particularly, to a novel methods and systems for reducing and managing power consumption in said devices.

BACKGROUND

The Internet of Things has grown into a multi-billion dollar market. A subset of this market includes asset tracking and monitoring. Asset tracking pertains to the tracking of articles as they travels from one place to another. Assets to be tracked include finished products moving through a supply chain, plasma donation processing and storage, animals, people, produce from farm to market, items in a warehouse, and so on. In some instances, one or more data metrics of the tracked asset itself, or the tracked asset's environment, is monitored during the course of a tracking period. Data metrics includes for example: temperature, light, humidity, vibration, position, weight, capacity, etc. The number and type of assets which can be tracked and monitored is virtually unlimited.

There are various asset tracking technologies that are in use today. Generally speaking, asset tracking technologies include very low function (and low-cost) passive technologies such as Radio Frequency Identification labels (RFID) and very high function active technologies such as Bluetooth and LoRa (Long Range radio). Passive technologies generally provide presence of an item when scanned by a reader located in general proximity to the item. Higher function active technologies generally provide item data metrics and location, and can read and/or command devices over long ranges (e.g., 1 km, 2 km, etc.). Some active tracking technologies may be used to send a command to a tracking device to take an action such as activate a switch, turn on a light, generate a sound, set an event condition, etc. A key distinction between lower function passive tracking and high function active tracking is the latter's need for a power source. Some active tracking platforms are operationally power hungry and expensive.

Conventionally, asset tracking devices are paired with a wireless gateway or hub (hereinafter referred to as a wireless transmitter, wireless transceiver, client, gateway, hub, or gateway/hub) to form an asset tracking and monitoring system. These gateway/hub devices wirelessly collect data metrics from tracking devices and relay the data over a communications network, such as a cellular network, corporate network, Internet, etc., to a corporate and/or cloud server(s).

The market for active tracking is in transition in corporations from a tactical asset to a strategic asset. As the cost of tracking devices continue to drop and features increase, tracking devices are being viewed by managers as an important platform for data generation and control. The trillions of bytes of data generated by these devices enables game changing advances in productivity and business system logistics.

Key cost design considerations in the development of active tracking devices include but are not limited to: (1) materials used in manufacturing; (2) automation of manufacturing and test; (3) number and types of electronic components; (3) form factor; (4) power management; (5) antenna design; (6) radio protocols and frequencies; and (7) embedded software/firmware footprint. With respect to the last item, finely tuned embedded control software/firmware enables said software to run on, for example, a very low-end single chip micro-controller with an integrated RF system and very small amounts of memory.

Generally, tracking and monitoring devices, hereafter referred to as Tags, are designed and/or configured with a power budget sufficient to enable a Tag to perform tracking and monitoring tasks through a required period of use or logistics duty cycle. At the end of the period or cycle or if the power source capacity (e.g., battery capacity) of the Tag falls below a user specified threshold, the Tag power source is recharged, replaced, or the Tag itself is disposed of, the latter two options creating material waste and recurring costs. A large power budget requires a large power source and attendant higher cost and larger footprint. Compounding power budget management is reduced effective capacity in harsh environments such as ultra-low cold temperature environments.

During a Tag's duty or life cycle, the Tag is continuously consuming various amounts of energy depending upon various states the Tag is in or tasks it is called upon to perform. The amount of power consumed is related to the device components used in a particular state and the duration of the state. Examples of Tag states include but are not limited to: shutdown (e.g., an idle microcontroller which can only wake due to an external event), deep sleep (e.g., an idle microcontroller but w/ stored memory and possible real-time clock (RTC) operation), sleep (e.g., an idle microcontroller which wakes up periodically to sniff (e.g., activates a transceiver for a brief instant) to detect a radio signal or signal preamble), listen (e.g., an active radio subsystem detecting/listening for a radio signal), transmit (e.g., an active radio subsystem transmitting a radio signal), receive (e.g., an active radio subsystem receiving a radio signal or signal preamble), charging (e.g., a rechargeable battery receiving a trickle charge via a wireless signal, a charge via a wired connection with an external power source, etc.), software update (e.g., receipt of a new firmware/software image and/or update), event detect (e.g., expiration of a timer, a sensor condition, a voltage change, etc.). It should be appreciated by those skilled in the art of asset tracking and monitoring that there are numerous Tag states only a subset of which are listed herein. Power consumption in various states may be, for example, 25 milli-Amps (mA) in a transmit state, 8 mA in a receive state, and 6 mA for a very short duration (e.g., 2 milli-second (ms), 3 ms, etc.) in a sniff/listening state. Depending upon data-rate transmissions (e.g., bits/second), transmit durations may vary from less than 10 ms to 80 ms or even higher. In an example embodiment, a radio system may be configured for transmit durations of 10 ms for most packet transmissions with an occasional 20 ms packet transmission. While transmitting consumes relatively high amounts of power for a short period, listening may be costly due to the length of time required to be in a listening state. In certain example embodiments, Tags may include an internal clock source which can be used to synchronize scheduled communications between the Tag and a companion hub/gateway. Without synchronization, or poor synchronization between a transmitter and receiver, a receiving Tag may need to actively listen (e.g., for 5, 10, 15 seconds, or longer) prior to actually receiving a packet.

Certain Tags may be controlled from a wireless hub/gateway. How responsive a controllable Tag is may affect power consumption. For example, a Tag which is actively listening for a command once a minute will consume more power than a Tag which needs to wake-up every hour to listen for a command as described above. In an example embodiment, to improve Tag responsiveness to a Tag command which may arrive at any time, a transmission preamble sniffing technique may be used. Another factor which may impact power management is the number of Tags clustered within range of a hub/gateway. If there is a very large cluster of Tags (e.g., tens of thousands) and all Tags may be called upon to perform certain tasks, all Tags need to be actively listening and decoding any received signal from the transmitter to determine if they are being called on. In an example scenario, in order to visually (e.g., by activating a Tag's Light Emitting Diode (LED)) identify 5 items to be removed from a warehouse of 10,000 Tags wherein each Tag of the 10,000 may be one of the 5, all 10,000 Tags' radio subsystem and processer consume energy whenever a wireless transmitter of the system issues an activate LED command. If Tags need to be very responsive (e.g., second(s) or minutes) to command/control requests, Tag power needs can become unmanageable.

There is a need for a low-cost, low-power, versatile tracking device that can provide accurate data analytics, including without limitation, location, environmental, and behavioral data, about a movable article or a group of movable articles.

SUMMARY OF THE INVENTION

The present invention uses novel methods and systems to achieve very low power consumption in a tracking and monitoring device which can be affixed to an article or group of articles of interest. The invention has the advantages of having a small form factor, low power consumption, and long range transmission capabilities. In an example embodiment, this specification describes a tracking device which comprises a power source of one or more rechargeable batteries with an electronic circuit and antenna capable of harvesting energy from an ambient field and receiving a radio signal.

In another example embodiment, this specification describes a tracking device which upon receipt of sufficient Radio Frequency (RF) energy in a charging circuit of the device, the charging circuit causes (e.g., via an interrupt signal) one or more device processors to change state. In an example embodiment, an energy detect state change causes a processor to change from a "processor shutdown" state to a "listen" state wherein the listen state includes activating an RF subsystem of the device. Advantageously, a tracking device of this design can be restful in a no or very low power state for a large percentage of the tracking devices' life/duty cycle while retaining a quick reaction time characteristic. This feature of wake-on energy detection is analogous to a "wireless on button".

In an alternate embodiment the energy detection signal causes a processor of a Tag to transition to a "sniff-before-listening" state. This is a state in which the RF subsystem of the Tag is configured to be in a low-power detection of incoming packet preambles before fully engaging the power of the radio to send and receive data. It allows the Tag to determine whether a "valid" transmitter might be attempting to communicate with it while using less power than the radio.

In another example embodiment, a Tag is comprised of a plurality of microprocessors wherein one of the microprocessors, is for example a "sensor controller" with limited capabilities, very low power operation, and is low cost. Optionally, the sensor controller is awakened from an off state or processor shutdown state upon an energy detect state change. Further to this example embodiment, the energy in the ambient field is a periodic pattern of on/off energy bursts wherein the pattern is detectable and decodable by processing samples from an Analog/Digital voltage converter in the sensor controller. The detected voltage pattern corresponds with an identifier which identifies one or more Tags. A Tag or Tags matching the communicated identifier activates their RF subsystem and transitions to one or more listening states as previously described. Optionally, if the detected pattern does not correspond to a Tag's identifier, the sensor controller transitions back to a processor shutdown state. Advantageously, the system only engages the radio subsystem in those Tags which need to come to attention while all others can remain at ease, dramatically reducing power consumption, including in a Tag cluster, while at the same time enabling a Tag to be nearly immediately responsive to commands.

In a variant of this example embodiment, a wireless transceiver of the system generates energy in an ambient field of the tag. Optionally, the wireless transceiver is a gateway/hub capable of sending and receiving Tag signals and, separately, generating a wireless power signal.

In a variant of this example embodiment, a hub/gateway of the system is capable of transmitting two separate frequencies, a first frequency and a second frequency. The first frequency is substantially distinct from the second frequency on the frequency spectrum. The charging circuit is designed to harvest energy from the first frequency and the RF subsystem is designed to receive and transmit data at the second frequency. In an example embodiment, the first frequency is less than 10 MHz (e.g., 6.78 MHz) and the second frequency is greater than 800 MHz (e.g., 866 MHZ for Europe and 915 MHz for US and AUS). Optionally, the selection of a first frequency and a second frequency are such that a Tag can be designed and/or configured with a dual frequency antenna. Optionally, the second frequency is a multiple of the first frequency to enable a single antenna coil to be used by a wireless transceiver of the system and a single coil antenna to be used by the Tag.

In a variant of this example embodiment, a hub/gateway of the system transmits at the first frequency a pattern of "on" and "off" modulated transmissions of varying length wherein the transmitted pattern encodes a series of "1s" and "0s" which corresponds to a Tag (or group of Tags) identifier.

In a further embodiment, the Tag comprises a power source wherein the power source comprises one or more of a battery, a rechargeable battery, a capacitor, a super capacitor, or a solar power collector or other tracking device power option known to those skilled in the art of power designs for tracking devices.

In an additional embodiment, the power source is a printed battery, a printed rechargeable battery, a printed capacitor, a super capacitor, or any combination thereof. Advantageously, the methods and systems of power efficiencies described herein enable simpler and smaller capacity power sources and corresponding lower cost expanding the number of use cases.

Lithium polymer rechargeable batteries (henceforth referred to as "LiPo" batteries) are a battery type commonly used in Tags. They provide long run times, high power, and can be customized/configured into various capacities and form factors. Conventionally, a Tag using a rechargeable LiPo battery would use two separate antennas, a first antenna for receiving a power signal and a second antenna for receiving and transmitting Tag data. In another variant on the example embodiment discussed herein, a single, dual-band antenna is used for both charging the battery and receiving and transmitting data. Advantageously, this reduces Tag cost by eliminating a separate charging circuit antenna.

In another embodiment, the tracking device comprises a highly integrated, single-chip microcontroller with a complete RF system.

In an alternate embodiment, the Tag includes one or more sensors configured to monitor at least one data metric, the data metric comprising one or more of: a temperature, a measurement of relative humidity, a traveling velocity, an acceleration, a measure of light, a shock, a pressure, a vibration, a location, a gas, a fire, energy harvested from a field, an orientation in space, a g-force, a sound, a stacking height, a weight, state of integrity, for example if a package has been opened.

In an additional embodiment, a Tag is configured to create an event condition based on input received from one or more sensors. Optionally, an RF subsystem of the Tag is configured to transmit an event condition to a wireless receiver configured to receive said event condition. Optionally, the Tag associated Gateway/Hub device is the wireless receiver configured to receive said event condition.

In yet another embodiment, a Tag is configured to receive and act on commands from a wireless transmitter, for example, to turn on or off an LED. Optionally, the wireless transmitter is an associated Gateway/Hub device. Optionally, a received command is to configure one or more Tag events and/or associated Tag event threshold conditions.

In yet another embodiment, the Tag is capable of transmitting and receiving data at various sub 1 GHz frequencies. In other embodiments the Tag is capable of using other radio networks and/or frequencies such as SIGFOX network, a long range radio "LoRa" network, a Weightless network, a Greenwaves network, an LTE-MTC network, a Haystack network, an Ingenu Random Phase Multiple Access, or a Narrow-Band Internet of Things ("N-B IoT") network, or other Internet of Things networks known to those skilled in the art of wireless networks.

In an example embodiment, a wireless charging station or mat is an optional component of a wireless tracking and monitoring system. Optionally, a Tag is recharged by placing one or a plurality of Tags on a wireless charging mat. Optionally, the one or a plurality of Tags receive energy from an ambient field surrounding each Tag generated by a wireless transmitter or transceiver in the mat (e.g. in the form of magnetic resonance.) Optionally, the mat's wireless transmitter generates a High-Frequency (HF) radio signal, such as a 6.78 MHz RF signal. The wireless power signal is received by an antenna/coil of the Tag and passed through a filter which removes other unwanted frequencies before receipt by a wireless power receiver. A charger circuit uses the power received through the wireless power receiver to charge a rechargeable battery of the Tag as further described herein below. In yet another example embodiment, a wireless charging station is comprised of an enclosure, similar in look and feel to a microwave oven. The charging station enclosure is comprised of a faraday cage to reduce leakage of unwanted RF signals. Optionally, the enclosure includes a door or drawer which may be opened to place, for example, a tray of Tags into the enclosure. Optionally, the enclosure includes a simple display which provides status indicators as further described below. The enclosure includes a wireless transmitter or transceiver similar to the mat wireless transmitter or transceiver. Optionally, the wireless transmitter or transceiver is designed into the top of the enclosure an inch or a few inches above where the Tags reside during recharging. Optionally, Tags in a charging station slowly rotate on a plate or saucer to enable all Tags periods of close proximity to the wireless transmitter or transceiver antenna coil. Optionally, the wireless transmitter or transceiver rotates and the Tag(s) remain fixed. Optionally, the display panel includes an on/off switch and one or more visual indicators (e.g., LEDs) to signal various recharging and/or refurbishing states including, for example, when all Tags have been topped off. The transceiver may receive certain wireless communications from each Tag indicating the status of each Tag's recharge state. Optionally, the wireless charging station may automatically switch off when all Tag's present in the station have been topped off (e.g., fully recharged). Optionally, the wireless transceiver may be used before, during, or after recharging to extract and clear each Tag's data logs (e.g., data metrics stored during the Tag's duty cycle) via wireless signal transmissions at the Ultra-High Frequency (UHF), for example 915 MHz. Optionally, the station enclosure display provides a status indicator when the data extraction phase is complete for all Tags. Optionally, the wireless transceiver may be used before, during, or after recharging to replace or update Tag firmware via wireless signal transmissions at the UHF, for example 915 MHz. Optionally, the station enclosure display provides a status indicator when the firmware replacement or update is complete for all Tags. Optionally, the wireless transceiver may be used during or after recharging to renew a Tag's security key(s) via wireless signal transmissions at the UHF, for example 915 MHz. Optionally, the station enclosure display provides a status indicator when the security key(s) renewal is complete for all Tags. As illustrated in the example embodiments described herein, advantageously, a plurality of Tags may be recharged simultaneously and no individual Tag requires a physical connection and disconnection, resulting in substantial labor savings. Similarly, a Tag's security features and firmware/software may be refreshed and/or upgraded without a physical connection and disconnection. Further, since Tags may be sealed in an enclosure during their manufacture and never have to be opened, for example, to replace a battery, Tag components are not subject to ambient elements which may exist in a Tag's environmental (e.g., dust, grime, static electricity, etc.) All of these features enable a Tag 1,000's of duty cycles (e.g., logistics tracking periods) over a period of years (e.g., 3, 5, 10, 15, etc. years.)

In the descriptions herein, microprocessor and processor may be used interchangeably.

In the descriptions herein, a microcontroller may include one or more microprocessors along with memory and programmable input and output peripherals.

By way of example, in an embodiment, a radio identification system, comprising: a first computing device configured to emit an information radio signal (e.g., a radio frequency signal used to transmit, receive, and/or exchange data from one or more radio frequency devices) and a wireless power signal (e.g., a radio frequency signal used to transmit energy to one or more devices capable of harvesting energy from a radio frequency signal); a second computing device comprising a first antenna tuned to receive the information radio signal, a radio frequency transceiver, a second antenna tuned to receive the wireless power signal, a wireless power receiver, a sensor controller configured with an analog-to-digital converter, and a microcontroller, wherein the sensor controller converts analog voltage patterns to a digital form; non-transitory media storing instructions readable by the radio communication identification system, that when executed by the radio communication identification system, cause the radio communication identification system to: transmit, by the first computing device, a plurality of wireless power signals; receive, at the second antenna of the second computing device, the plurality of wireless power signals; harvest, by the wireless power receiver associated with the second antenna of the second computing device, energy from the received plurality of wireless power signals; determine, by the sensor controller, an identifier corresponding to an energy pattern of the received plurality of wireless power signals; and, if the identifier matches an identifier associated with the second computing device, initiate a sensor controller interrupt instruction to the microcontroller to transition the microcontroller from a sleep state into a power consuming state wherein the microcontroller in the power consuming state is configured to receive the information radio signal; and, optionally transmit, by the first computing device, an information radio signal; receive, at the first antenna and associated radio frequency transceiver of the second computing device, the transmitted information radio signal of the first computing device; and, store in computer memory, by the microcontroller of the second computing device in computer memory of the second computing device, at least a portion of the information transmitted in the received information signal, including for examples, an event condition, time-of-day, set a timer, a software patch, a software upgrade, etc.; and, optionally if the identifier does not match an identifier associated with the second computing device, the sensor controller does not initiate the interrupt instruction to the microcontroller to transition the microcontroller from a sleep state into a power consuming state; and, optionally wherein the microcontroller sleep state is a state in which the microcontroller is consuming no power or very low power as compared to a non-sleep state; and, optionally wherein the second antenna is tuned to resonate with the wireless power signal wherein the wireless power signal is a radio frequency or band of frequencies less than 10 MHz (e.g.'s, 6.78 MHz or a band of 6.70 to 6.80 MHz, etc.) and wherein the first antenna is further tuned to resonate with the information radio signal wherein the information radio signal is a radio frequency or band of frequencies in the 850-950 MHz band (e.g.'s, 866 MHz, 915 MHz, a band of 860 to 870 MHz, a band of 910 to 915 MHz, etc.); and, optionally wherein the radio identification system comprises a plurality of second computing devices within radio communication range of the first computing device and wherein the plurality of second computing devices is greater than a thousand; and, optionally wherein each second computing device is assigned an identifier, and wherein a portion or portions of the plurality of second computing devices have the same identifier; and, optionally wherein the first computing device comprises a computing device which is configured to emit the information radio signal and a separate computing device configured to emit the wireless power signal; and, optionally wherein there are a plurality of first computing devices and second computing devices within radio range of each other; and, optionally wherein there are two first computing devices.

By way of another example, in an embodiment, a radio identification system, comprising: a first computing device configured to emit an information radio signal (e.g., a radio frequency signal used to transmit, receive, and/or exchange data from one or more radio frequency devices) and a wireless power signal (e.g., a radio frequency signal used to transmit energy to one or more devices capable of harvesting energy from a radio frequency signal); a second computing device comprising a first antenna tuned to receive the information radio signal, a radio frequency transceiver, a second antenna tuned to receive the wireless power signal, a wireless power receiver, a sensor controller configured with an analog-to-digital converter, and a microcontroller, wherein the sensor controller converts analog voltage patterns to a digital form; non-transitory media storing instructions readable by the radio communication identification system, that when executed by the radio communication identification system, cause the radio communication identification system to: transmit, by the first computing device, a plurality of wireless power signals; receive, at the second antenna of the second computing device, the plurality of wireless power signals; harvest, by the wireless power receiver associated with the second antenna of the second computing device, energy from the received plurality of wireless power signals; determine, by the sensor controller, an identifier corresponding to an energy pattern of the received plurality of wireless power signals; and, if the identifier matches an identifier associated with the second computing device, initiate a sensor controller interrupt instruction to the microcontroller to transition the microcontroller from a sleep state into a power consuming state wherein the microcontroller in the power consuming state is configured to receive the information radio signal; and, optionally transmit, by the first computing device, an information radio signal; receive, at the first antenna and associated radio frequency transceiver of the second computing device, the transmitted information radio signal of the first computing device; and, store in computer memory, by the microcontroller of the second computing device in computer memory of the second computing device, at least a portion of the information transmitted in the received information signal, including for examples, an event condition, time-of-day, set a timer, a software patch, a software upgrade, etc.; and, optionally if the identifier does not match an identifier associated with the second computing device, the sensor controller does not initiate the interrupt instruction to the microcontroller to transition the microcontroller from a sleep state into a power consuming state; and, optionally wherein the microcontroller sleep state is a state in which the microcontroller is consuming no power or very low power as compared to a non-sleep state; and, optionally wherein the second antenna is tuned to resonate with the wireless power signal wherein the wireless power signal is a radio frequency or band of frequencies less than 10 MHz (e.g.'s, 6.78 MHz or a band of 6.70 to 6.80 MHz, etc.) and wherein the first antenna is further tuned to resonate with the information radio signal wherein the information radio signal is a radio frequency or band of frequencies in the 850-950 MHz band (e.g.'s, 866 MHz, 915 MHz, a band of 860 to 870 MHz, a band of 910 to 915 MHz, etc.); and, optionally wherein the radio identification system comprises a plurality of second computing devices within radio communication range of the first computing device and wherein the plurality of second computing devices is greater than a thousand; and, optionally each second computing device is assigned a unique identifier; and, optionally wherein the first computing device comprises a computing device which is configured to emit the information radio signal and a separate computing device configured to emit the wireless power signal; and, optionally wherein there are a plurality of first computing devices and second computing devices within radio range of each other; and, optionally wherein there are two first computing devices.

By way of a further example, in an embodiment, a radio identification system, compromising: a first computing device configured to emit an information radio signal and a wireless power signal; a second computing device comprising an antenna tuned to receive the information radio signal and the wireless power signal, a radio frequency transceiver, a wireless power receiver with an associated sensor controller, the sensor controller further configured with an analog-to-digital converter, and a microcontroller, and wherein the sensor controller converts analog voltage patterns to a digital form, and wherein the antenna is coupled with a first filter which is configured to the pass wireless power signal to the wireless power receiver, and wherein the antenna is coupled with a second filter which is configured to pass the information radio signal to the radio frequency transceiver; and, non-transitory media storing instructions readable by the radio communication identification system, that when executed by the radio communication identification system, cause the radio communication identification system to: transmit, by the first computing device, a plurality of wireless power signals; receive, at the antenna of the second computing device, the plurality of wireless power signals; harvest, by the wireless power receiver associated with the antenna, energy from the received plurality of wireless power signals; and, if the identifier matches an identifier associated with the second computing device, initiate a sensor controller interrupt instruction to the microcontroller to transition the microcontroller from a sleep state into a power consuming state wherein the microcontroller in the power consuming state is configured to receive the information radio signal; and, optionally transmit, by the first computing device, an information radio signal; and, receive, at the antenna and associated radio frequency transceiver of the second computing device, the transmitted information radio signal of the first computing device; and store in computer memory, by the microcontroller of the second computing device, at least a portion of the information transmitted in the received information signal; and, optionally if the identifier does not match an identifier associated with the second computing device, the sensor controller does not initiate the interrupt instruction to the microcontroller to transition the microcontroller from a sleep state into a power consuming state; and, optionally wherein the antenna is tuned to resonate with the wireless power signal wherein the wireless power signal is a radio frequency or band of frequencies less than 10 MHz and wherein the antenna is further tuned to resonate with the information radio signal wherein the information radio signal is a radio frequency or band of frequencies in the 850-950 MHz band; and, optionally wherein the radio identification system comprises a plurality of second computing devices within radio communication range of the first computing device and wherein each of the plurality of second computing devices has a unique identifier; and, optionally wherein the microcontroller sleep state is a state in which the microcontroller is consuming no power or very low power as compared to a non-sleep state; and, optionally wherein the plurality of second computing devices is greater than a thousand; and, optionally wherein the first computing device comprises a computing device which is configured to emit the information radio signal and a separate computing device configured to emit the wireless power signal; and, optionally wherein there are a plurality of first computing devices and second computing devices within radio range of each other; and, optionally wherein there are two first computing devices.

By way of yet another example, in an embodiment, a radio identification system, compromising: a first computing device configured to emit an information radio signal and a wireless power signal; a second computing device comprising an antenna tuned to receive the information radio signal and the wireless power signal, a radio frequency transceiver, a wireless power receiver with an associated sensor controller, the sensor controller further configured with an analog-to-digital converter, and a microcontroller, and wherein the sensor controller converts analog voltage patterns to a digital form, and wherein the antenna is coupled with a first filter which is configured to pass the wireless power signal to the wireless power receiver, and wherein the antenna is coupled with a second filter which is configured to pass the information radio signal to the radio frequency transceiver; and, non-transitory media storing instructions readable by the radio communication identification system, that when executed by the radio communication identification system, cause the radio communication identification system to: transmit, by the first computing device, a plurality of wireless power signals; receive, at the antenna of the second computing device, the plurality of wireless power signals; harvest, by the wireless power receiver associated with the antenna, energy from the received plurality of wireless power signals; and, if the identifier matches an identifier associated with the second computing device, initiate a sensor controller interrupt instruction to the microcontroller to transition the microcontroller from a sleep state into a power consuming state wherein the microcontroller in the power consuming state is configured to receive the information radio signal; and, optionally transmit, by the first computing device, an information radio signal; and, receive, at the antenna and associated radio frequency transceiver of the second computing device, the transmitted information radio signal of the first computing device; and store in computer memory, by the microcontroller of the second computing device, at least a portion of the information transmitted in the received information signal; and, optionally if the identifier does not match an identifier associated with the second computing device, the sensor controller does not initiate the interrupt instruction to the microcontroller to transition the microcontroller from a sleep state into a power consuming state; and, optionally wherein the antenna is tuned to resonate with the wireless power signal wherein the wireless power signal is a radio frequency or band of frequencies less than 10 MHz and wherein the antenna is further tuned to resonate with the information radio signal wherein the information radio signal is a radio frequency or band of frequencies in the 850-950 MHz band; and, optionally wherein the radio identification system comprises a plurality of second computing devices within radio communication range of the first computing device wherein each second computing device is assigned an identifier, and wherein a portion or portions of the plurality of second computing devices have the same identifier; and, optionally wherein the microcontroller sleep state is a state in which the microcontroller is consuming no power or very low power as compared to a non-sleep state; and, optionally wherein the plurality of second computing devices is greater than a thousand; and, optionally wherein the first computing device comprises a computing device which is configured to emit the information radio signal and a separate computing device configured to emit the wireless power signal; and, optionally wherein there are a plurality of first computing devices and second computing devices within radio range of each other; and, optionally wherein there are two first computing devices.

By way of yet another example, in an embodiment, a method of processing a call comprising: a computing device comprising an antenna tuned to receive an information radio signal and a wireless power signal, a radio frequency transceiver, a wireless power receiver with an associated a sensor controller, the sensor controller further configured with an analog-to-digital converter, and a microcontroller, wherein the sensor controller converts analog voltage patterns to a digital form, and wherein the antenna is coupled with a first filter which is configured to pass wireless power signals to the wireless power receiver, and wherein the antenna is couple with a second filter which is configured to pass information radio signals to the radio frequency transceiver; non-transitory media storing instructions readable by the radio communication identification system, that when executed by the radio communication identification system, cause the radio communication identification system to: receive, at the antenna of the computing device, a plurality of wireless power signals; harvest, by the wireless power receiver associated with the antenna, energy from the received plurality of wireless power signals; determine, by the sensor controller, an identifier corresponding to an energy pattern of the received plurality of wireless power signals; if the identifier matches an identifier associated with the computing device, initiate a sensor controller interrupt instruction to the microcontroller to transition the microcontroller from a sleep state into a power consuming state wherein the microcontroller in the power consuming state is configured to receive the information radio signal; and, optionally receive, at the antenna and associated radio frequency transceiver of the computing device, a transmitted information radio signal; and store in computer memory, by the microcontroller of the computing device, at least a portion of the information transmitted in the received information signal; and, optionally if the identifier does not match an identifier associated with the computing device, the sensor controller does not initiate the interrupt instruction to the microcontroller to transition the microcontroller from a sleep state into a power consuming state; and, optionally wherein the antenna is tuned to resonate with the wireless power signal wherein the wireless power signal is a radio frequency or band of frequencies less than 10 MHz and wherein the antenna is also tuned to resonate with the information radio signal wherein the information radio signal is a radio frequency or band of frequencies in the 850-950 MHz band; and, optionally wherein the first filter is configured to pass a wireless power signal to the wireless power receiver at a radio frequency or band of frequencies less than 10 MHz and wherein the second filter is configured to pass a wireless power signal to the wireless power receiver at a radio frequency or band of frequencies in the 850-950 MHz band; and, optionally wherein the microcontroller sleep state is a state in which the microcontroller is consuming no power or very low power as compared to a non-sleep state; and, optionally wherein the radio identification system comprises a plurality of second computing devices within radio communication range of the first computing device and wherein the plurality of second computing devices is greater than a thousand; and, optionally wherein each second computing device has an identifier, and wherein a portion or portions of the plurality of second computing devices have the same identifier.

By way of yet another example, in an embodiment, a method of processing a call comprising: a computing device comprising an antenna tuned to receive an information radio signal and a wireless power signal, a radio frequency transceiver, a wireless power receiver with an associated a sensor controller, the sensor controller further configured with an analog-to-digital converter, and a microcontroller, wherein the sensor controller converts analog voltage patterns to a digital form, and wherein the antenna is coupled with a first filter which is configured to pass wireless power signals to the wireless power receiver, and wherein the antenna is couple with a second filter which is configured to pass information radio signals to the radio frequency transceiver; non-transitory media storing instructions readable by the radio communication identification system, that when executed by the radio communication identification system, cause the radio communication identification system to: receive, at the antenna of the computing device, a plurality of wireless power signals; harvest, by the wireless power receiver associated with the antenna, energy from the received plurality of wireless power signals; determine, by the sensor controller, an identifier corresponding to an energy pattern of the received plurality of wireless power signals; if the identifier matches an identifier associated with the computing device, initiate a sensor controller interrupt instruction to the microcontroller to transition the microcontroller from a sleep state into a power consuming state wherein the microcontroller in the power consuming state is configured to receive the information radio signal; and, optionally receive, at the antenna and associated radio frequency transceiver of the computing device, a transmitted information radio signal; and store in computer memory, by the microcontroller of the computing device, at least a portion of the information transmitted in the received information signal; and, optionally if the identifier does not match an identifier associated with the computing device, the sensor controller does not initiate the interrupt instruction to the microcontroller to transition the microcontroller from a sleep state into a power consuming state; and, optionally wherein the antenna is tuned to resonate with the wireless power signal wherein the wireless power signal is a radio frequency or band of frequencies less than 10 MHz and wherein the antenna is also tuned to resonate with the information radio signal wherein the information radio signal is a radio frequency or band of frequencies in the 850-950 MHz band; and, optionally wherein the first filter is configured to pass a wireless power signal to the wireless power receiver at a radio frequency or band of frequencies less than 10 MHz and wherein the second filter is configured to pass a wireless power signal to the wireless power receiver at a radio frequency or band of frequencies in the 850-950 MHz band; and, optionally wherein the microcontroller sleep state is a state in which the microcontroller is consuming no power or very low power as compared to a non-sleep state; and, optionally wherein the radio identification system comprises a plurality of second computing devices within radio communication range of the first computing device and wherein the plurality of second computing devices is greater than a thousand; and, optionally wherein each second computing device has an identifier, and wherein each second computing device has a unique identifier.

The foregoing has outlined rather broadly the features and technical advantages of the present invention in order that the detailed description of the invention that follows may be better understood. Additional features and advantages of the invention will be described hereinafter, which form the subject of the claims of the invention. It should be appreciated by those skilled in the art that the conception and specific embodiment disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

DETAILED DESCRIPTION

The following detailed description of the invention references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the present invention. The following detailed description is, therefore, not to be taken in a limiting sense. The scope of the present invention is defined only by the appended claims, along with the full scope of equivalents to which such claims are entitled.

In this description, references to "one embodiment", "an embodiment", or "embodiments" mean that the feature or features being referred to are included in at least one embodiment of the technology. Separate references to "one embodiment", "an embodiment", or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the current technology can include a variety of combinations and/or integrations of the embodiments described herein.

The detailed description of an asset tracking and monitoring device which uses novel methods and systems to achieve very low power consumption which can be affixed to an article or group of articles of interest is presented herein. The invention has the advantages of having a small form factor, low power consumption, and long range transmission capabilities.

Figure 1:
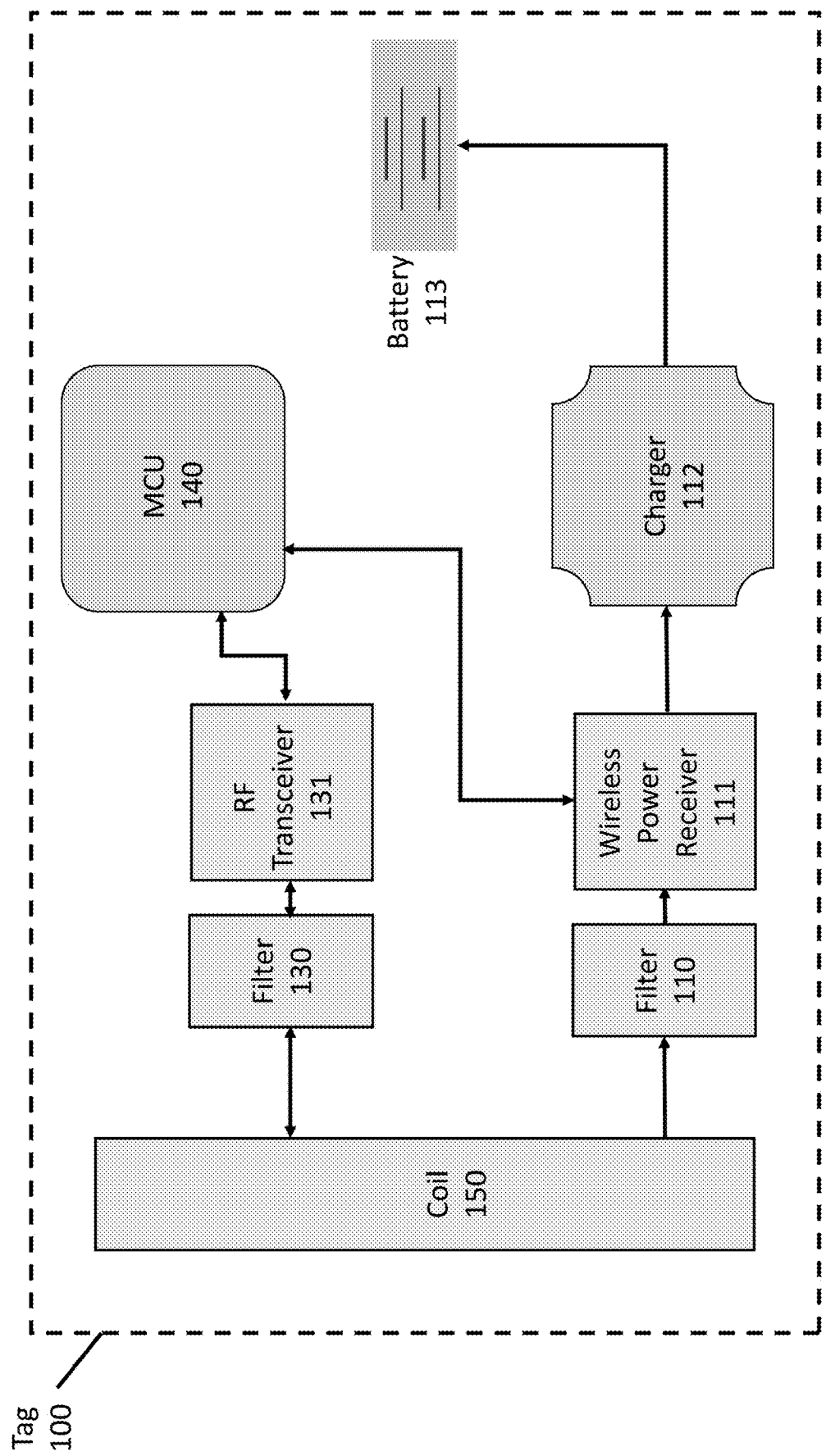
FIG. 1 illustrates an example embodiment of an asset monitoring and tracking device.

Turning now to FIG. 1, illustrated is a functional block diagram representing an embodiment of an asset tracking and monitoring device, Tag 100, comprising Coil 150, Filters 110 and 130, Wireless Power Receiver 111, Charger 112, Battery 113, Micro Controller (or Microcontroller) Unit (MCU) 140, and Radio Frequency Modulated (RF) Transceiver 131. In this example embodiment of a Tag, the power source of the Tag is a rechargeable battery including for example a LiPo rechargeable battery. Optionally, the functionality of one or more of the block diagrams of FIG. 1 may be a part of or encapsulated in a single component. For example, a Micro Controller Unit may include a Frequency Modulated Transceiver capability or Filters 110 and 130 may be a single Dual-Band Filter.

Coil 150 may comprise a trace on a PCB such as is typically used by resonant power transmission devices. FIG. 1 illustrates a common Coil 150 used for both wireless power reception and RF signal transmission/reception; however, separate coils may also be used for each of these two functions. Optionally, RF signal transmission/reception is configured in an Ultra High Frequency (UHF) range between 800 MHz and 1 GHz. Optionally, wireless power reception is configured in a High Frequency (HF) range between 5 MHz and 20 MHz. In an example embodiment Coil 150 is tuned to a transmission/reception radio frequency of 915 MHz or 866 MHz and a wireless power transmission frequency receives of 6.78 MHz.

Coil 150 is coupled to Filter 110 and Filter 130. Filter 110 is coupled to Wireless Power Receiver 111 which in turn is coupled to Charger 112. The output from Charger 112 is coupled to Battery 113. Charger 112 and Battery 113 are each coupled to a system bus (not shown in FIG. 1) which distributes power to all of system components in Tag 100. Filter 130 is coupled to RF Transceiver 131, which is coupled to Microcontroller Unit (MCU) 140 which functions as the system controller and is coupled to Wireless Power Receiver 111.

Five different operating modes of Tag 100, designated as (1) charge mode, (2) radio receive mode, (3) radio transmit mode, (4) wake-up mode, and (5) wake-up on ID mode will now be described in more detail. These five operating modes are illustrated in FIGS. 2, 3, 4, 5, and 6 respectively. FIGS. 2, 3, 4, 5, and 6 illustrate the same components that are illustrated in FIG. 1 (except a new component is added to FIG. 6), except that unused system components and couplings are not shown to simplify the illustration, and input and output signals are illustrated as appropriate for the operating mode being discussed. The following example embodiment refers to a frequency modulated signal to be used for transmitting from or receiving to RF Transceiver 131 for purposes of exchanging data with a remote wireless transceiver (e.g., a hub or gateway 900 as described herein.) It will be understood that other forms of signal modulation and associated transceivers can also be used including, but not limited to, phase-shift keying, frequency-shift keying, amplitude modulation, amplitude-shift keying, on-off keying, quadrature amplitude modulation, Gaussian frequency-shift keying, and continuous phase modulation.

Figure 2:
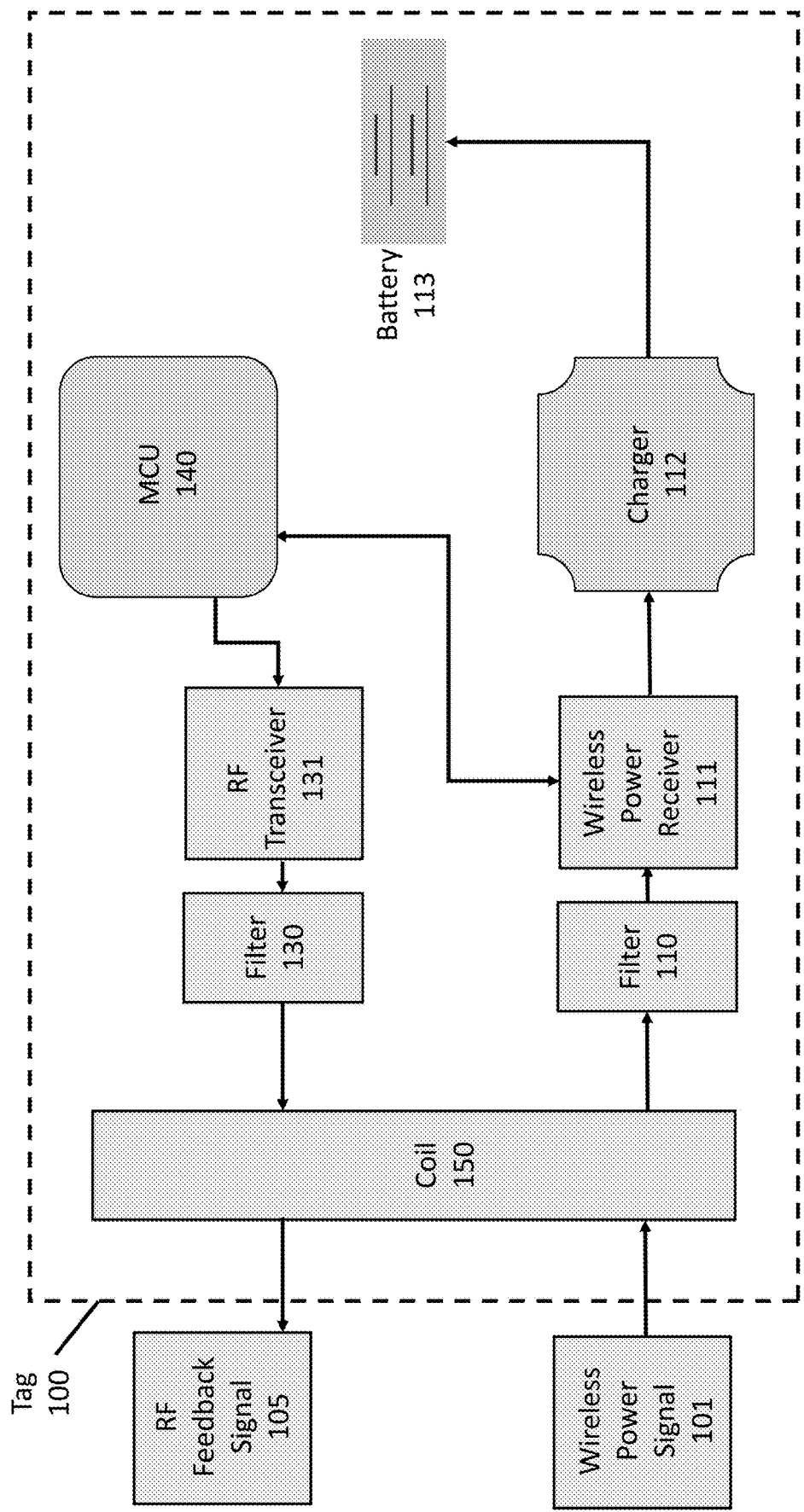
FIG. 2 illustrates an example embodiment of an asset monitoring and tracking device in receipt of a HF wireless power signal and generating a UHF feedback signal.
Figure 9:
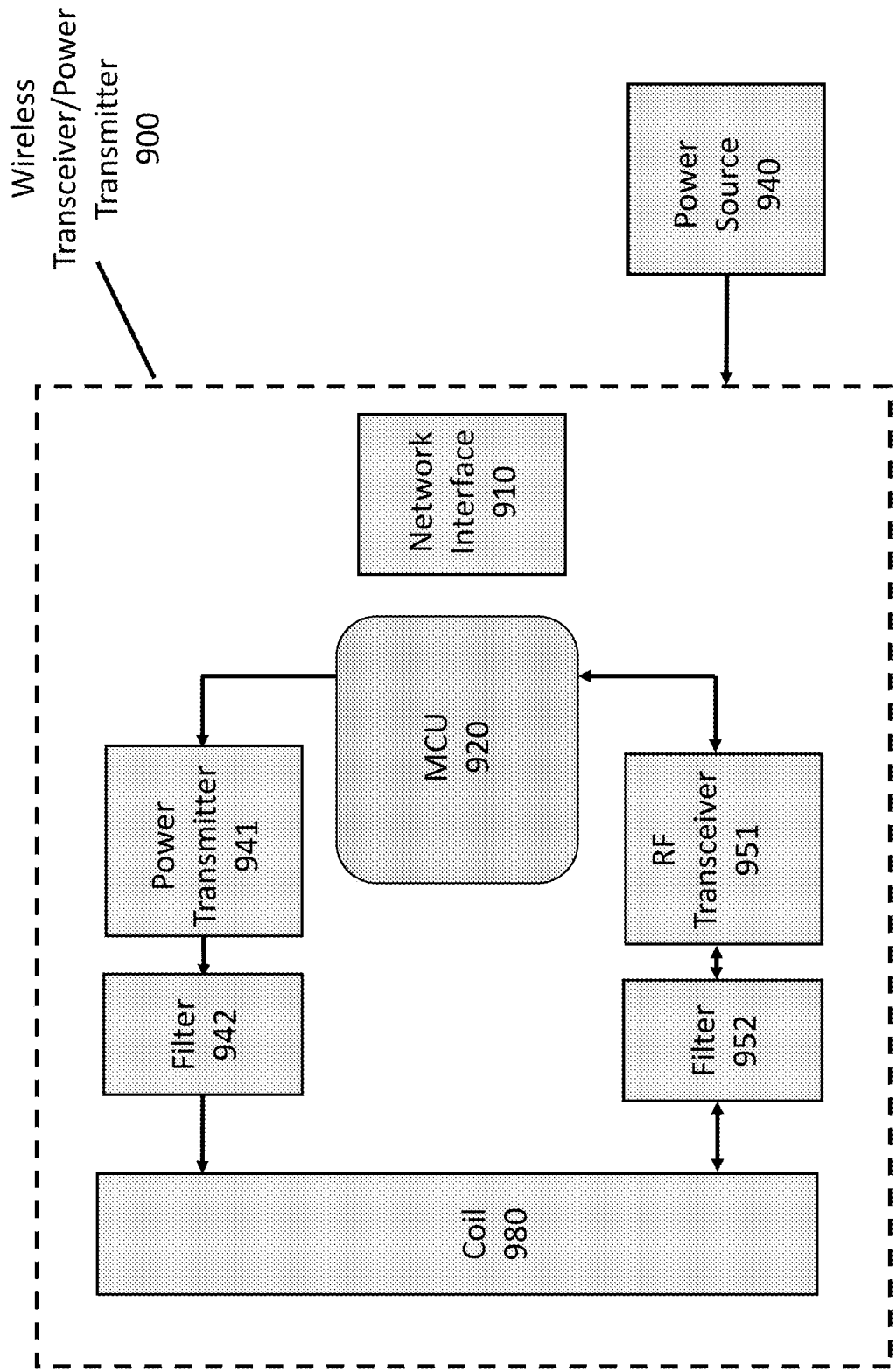
FIG. 9 illustrates an example embodiment of a wireless transceiver/power transmitter.

FIG. 2 illustrates an example embodiment of the charge mode in which the Tag 100 is placed onto a surface of or is in proximity to a wireless power transmitter (e.g., a Wireless Transceiver/Power Transmitter 900 illustrated in FIG. 9.) FIG. 2 also illustrates an RF Feedback Signal 105 to a Wireless Transceiver/Power Transmitter 900. Optionally, the Tag 100 is placed in a charging station, such as a refurbishing station, in which a plurality of Tags are charged/recharged simultaneously. The Wireless Transceiver/Power Transmitter 900 transmits a Wireless Power Signal 101 to Tag 100. Wireless power transmission may occur in the form of magnetic resonance. Optionally, the Wireless Power Signal 101 is transmitted at 6.78 MHz. The power transmitting Wireless Power Signal 101 is received by Coil 150 which is coupled to Filter 110 and Filter 130. Filter 110 passes the transmitted HF frequency and removes other unwanted frequencies to Wireless Power Receiver 111. Filter 130 also blocks the Wireless Power Signal 101 from getting to RF Transceiver 131. Wireless Power Receiver 111 may comprise an output capacitor and full-wave rectifier which comprises high-speed semiconductor switches. The semiconductor switches may be enhancement mode Power MOSFETs. Charger 112 uses the power received through Wireless Power Receiver 111 to charge Battery 113. MCU 140 controls charging of Battery 113 by controlling Wireless Power Receiver 111. Optionally, the MCU 140 may control charging of Battery 113 by controlling Charger 112. Optionally, MCU 140 also communicates with the Wireless Transceiver/Power Transmitter 900 by sending an RF Feedback Signal 105 (e.g., at a frequency of 918 MHz) through RF Transceiver 131, Filter 130, and Coil 150. The information in the RF feedback signal may comprise battery status information such as whether or not the battery has reached full charge. It should be noted that in the here-to-fore mentioned operational mode, Coil 150 enables both the receipt of a Wireless Power Signal 101 and the transmission of an RF Feedback Signal 105.

Other configurations are possible for Wireless Power Receiver 111, such as, but not limited to, a full-wave diode bridge in series with a capacitor that resonates with Coil 150 at the frequency of the wireless power transmission. In choosing components for Wireless Power Receiver 111, it is important that the components are configured to rectify the voltage across Coil 150 and that the net input impedance of Wireless Power Receiver 111 combined with Filter 110 resonates with Coil 150 at the frequency of the wireless power transmission.

Figure 3:
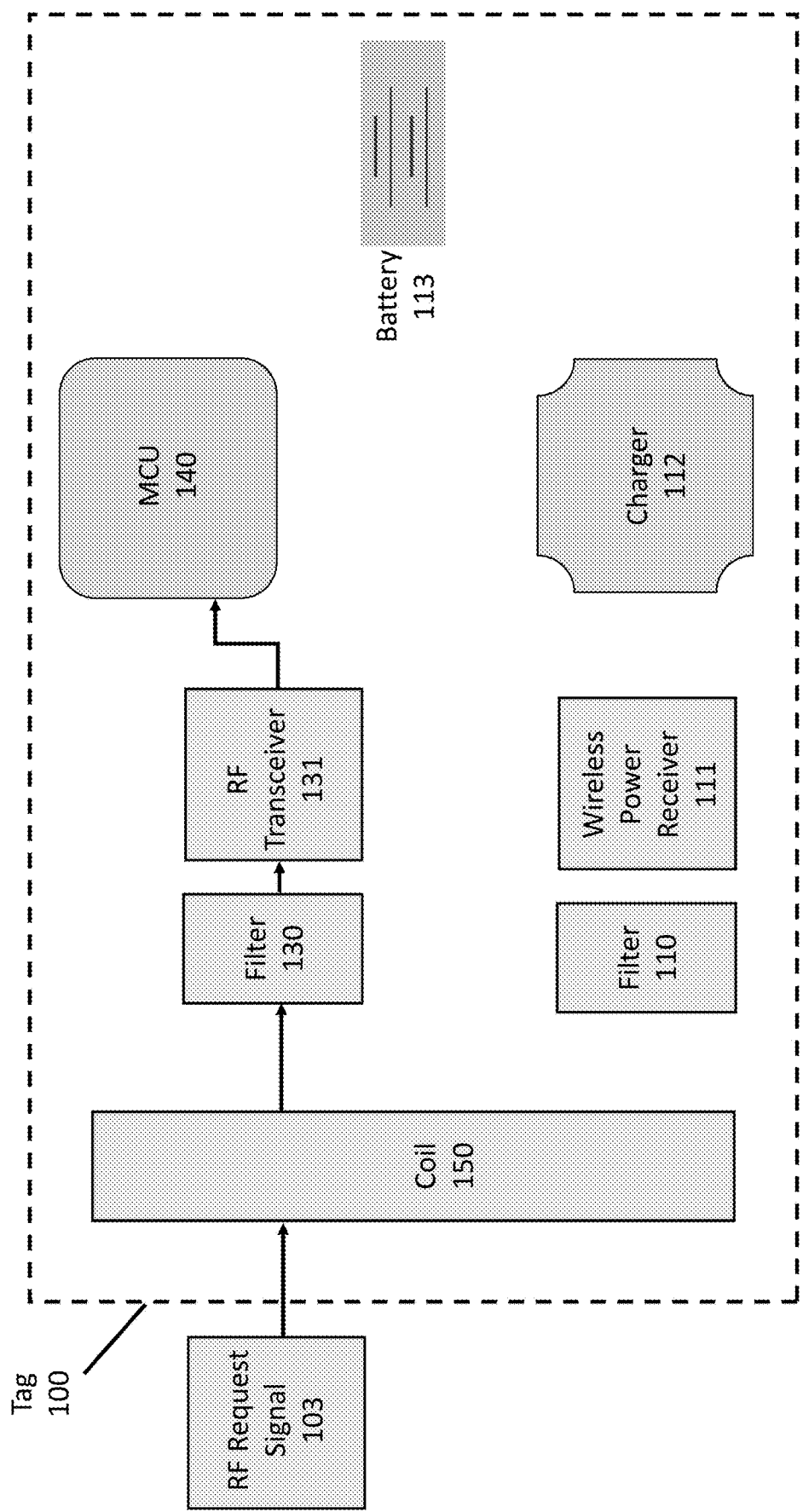
FIG. 3 illustrates an example embodiment of an asset monitoring and tracking device in receipt of an UHF request signal.

FIG. 3 illustrates an example embodiment of the radio receive mode for Tag 100 in which Tag 100 is in active listen mode (including the various listen states described herein) and receives a signal request from a Wireless Transceiver/Power Transmitter 900 (e.g., a hub/gateway device transmitting a signal at 915 MHz.) In an example embodiment, the signal request may be a Tag status request including for examples, battery capacity, sensor temperature, location (e.g., proximity to a detected beacon(s)), etc. In this embodiment RF Transceiver 131 receives RF Request Signal 103 from a remote client (e.g., hub or gateway device) through Coil 150. Filter 130 passes the RF Request Signal 103 (such as 918 MHz signal) and removes other unwanted frequencies. Filter 110, also coupled to Coil 150, blocks the RF Request Signal 103 from getting to Wireless Power Receiver 111. RF Transceiver 131 relays the received signal request to MCU 140 for signal request processing.

Figure 4:
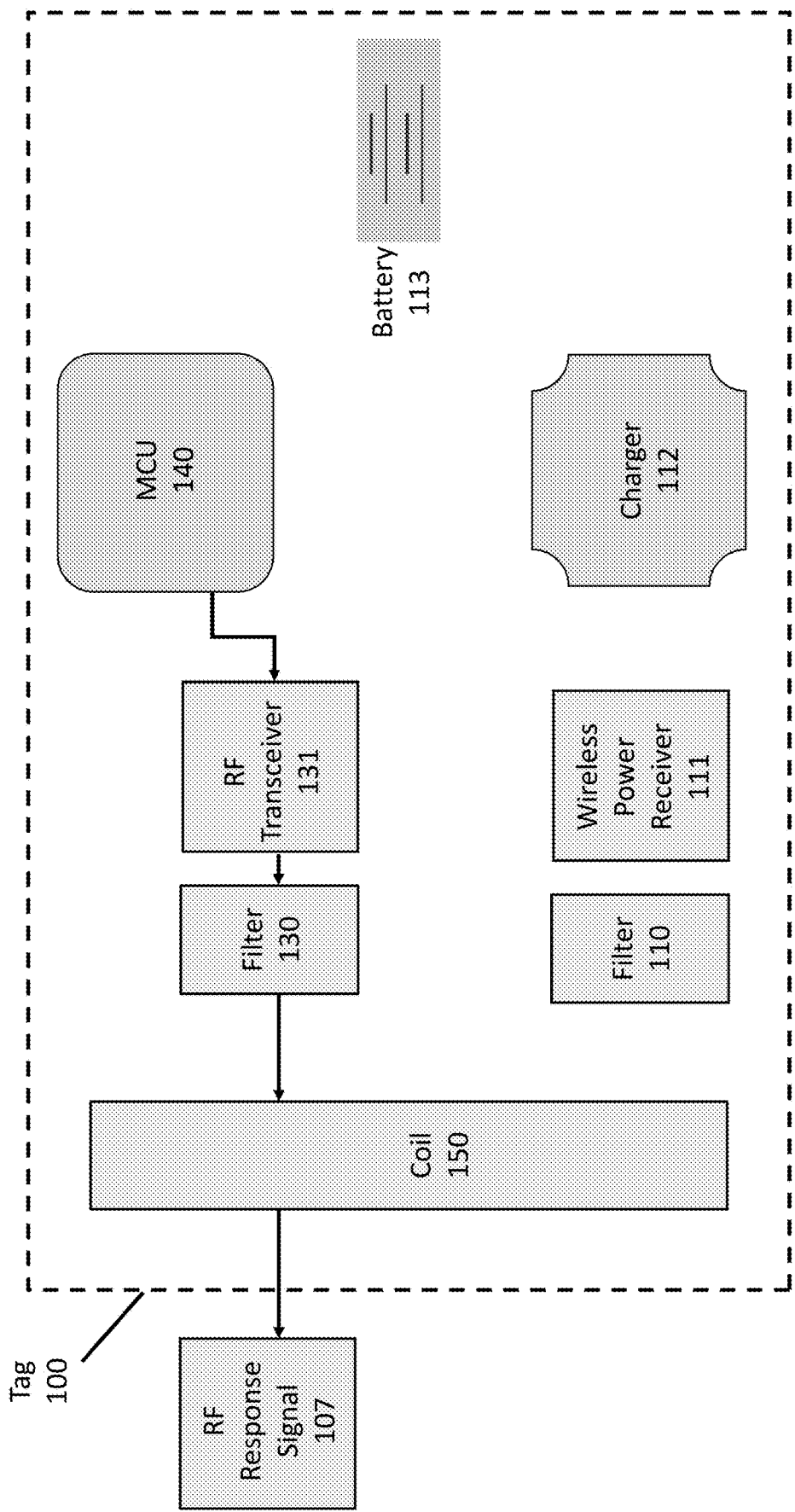
FIG. 4 illustrates an example embodiment of an asset monitoring and tracking device generating an UHF response signal.

FIG. 4 illustrates an example embodiment of the radio transmit mode for Tag 100 in which Tag 100 initiates an RF response transmission, for example a response to RF Request Signal 103, to a remote client (e.g., a receiving hub/gateway device illustrated in FIG. 9.) The signal response may include Tag 100 information including, for examples, battery capacity, sensor data (e.g., temperature), location (e.g., proximity to a detected beacon(s)), etc. The MCU 140 formats a response and sends the formatted response to RF Transceiver 131 which transmits a corresponding RF Response Signal 107 using frequency modulation through Coil 150. The resulting transmission signal is illustrated as RF Response Signal 107 in FIG. 4. Optionally, RF Response Signal 107 is transmitted at a center frequency of 918 MHz; however, other broadcast frequencies are possible.

Figure 5:
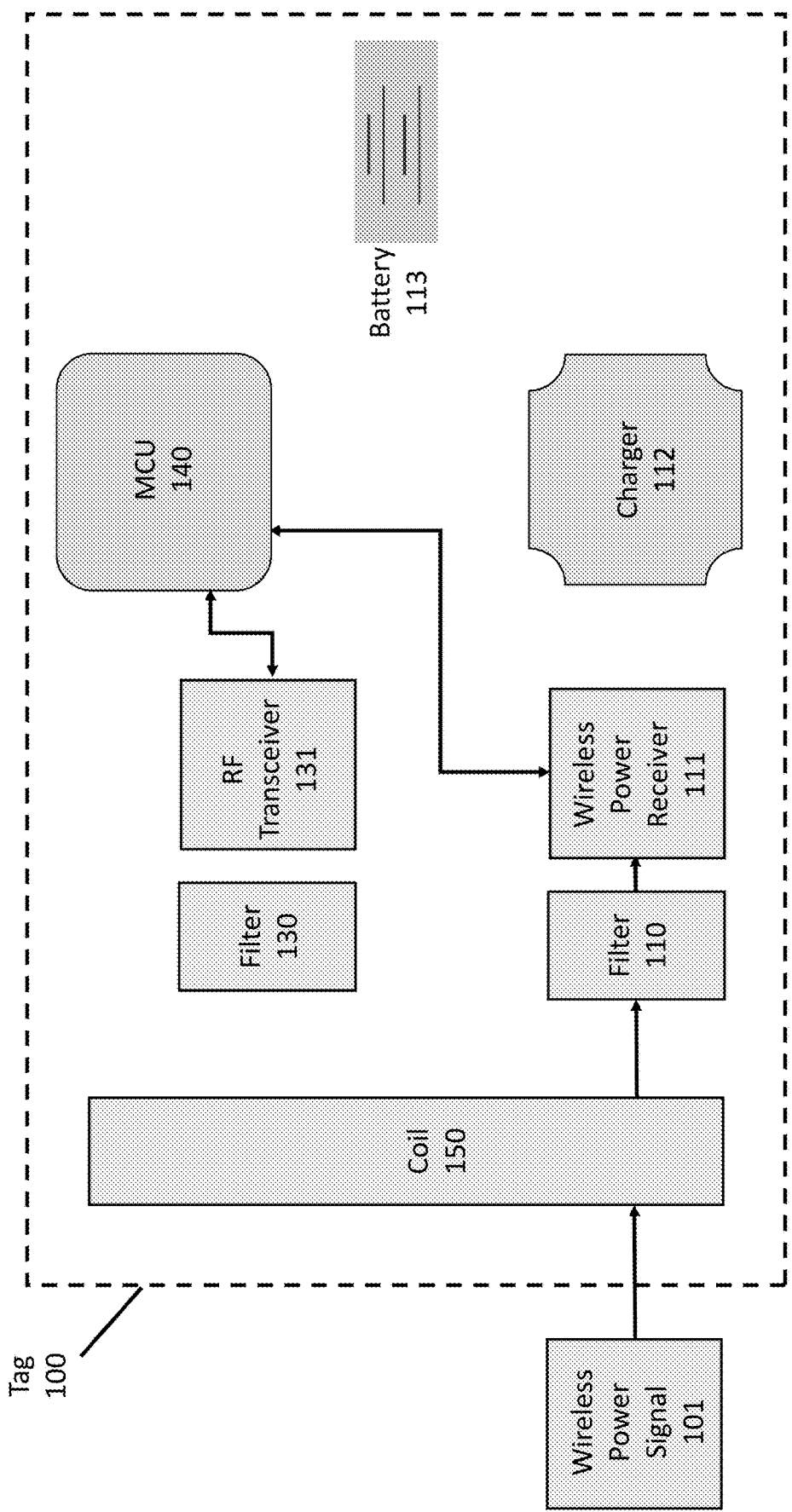
FIG. 5 illustrates an example embodiment of an asset monitoring and tracking device in a sleep state in the presence of a HF wireless power signal.

FIG. 5 illustrates an example embodiment of the wake-up mode for Tag 100. In this example embodiment Tag 100 is affixed to an article of interest and is providing certain tracking and monitoring functions. For example, Tag 100 may be affixed to an item in a freezer at −30 C for an extend period of time (e.g., 60 days.) Further to this example embodiment there is a need for Tag 100 to be responsive to an unplanned RF Request Signal 103 in a timely manner (e.g., a 1 minute or less Tag response.) To conserve power, Tag 100 may be configured to be in an extremely low power state with RF Transceiver 131 in an inactive state across its planned duty cycle (e.g., 60 days) except for schedule daily or weekly status reporting. Thus, for most of the time in this example embodiment, the Tag 100 is using extremely low amounts of energy (e.g., single digit uA (micro Amperes) in a sleep state). Disadvantageously, if Tag 100 is in a sleep state without RF Transceiver 131 in an active listening mode, Tag 100 will fail to respond to the unplanned RF Request Signal 103. As can be seen in this example scenario, operational environments with unplanned Tag 100 requests can be very costly with respect to active and/or sniffing listening power needs. Advantageously, the following wake-up mode enables very low power consumption and a responsive Tag across a long period Tag life-cycle (e.g., 1 or more years.)

Returning to FIG. 5, in this example embodiment Tag 100 is in a restful or very low power state in which RF Transceiver 131 is powered off along with MCU 140. A wireless client (e.g., a Wireless Transceiver/Power Transmitter 900 or hub/gateway as illustrated in FIG. 9) transmits a Wireless Power Signal 101 to Tag 100. Optionally, the Wireless Power Signal 101 is transmitted at 6.78 MHz. The power transmitting Wireless Power Signal 101 is received by Coil 150 which is coupled to Filter 110. Filter 110 passes the transmitting frequency (such as 6.78 MHz) and removes other unwanted frequencies to Wireless Power Receiver 111. The Wireless Power Receiver 111 sends an interrupt signal to MCU 140 causing the MCU 140 to wake-up in response to the detection of the Wireless Power Signal 101. Optionally, the interrupt signal to MCU 140 is a General Purpose Input/Output (GPIO) wake-up interrupt. Upon MCU 140 wakeup, MCU activates the RF Transceiver 131 enabling the receipt of a subsequent RF Request Signal 103 as previously described. Advantageously, as illustrated in this example embodiment, a Tag 100 configured to receive a Wireless Power Signal 101 may operate in a very low power mode, be awaken at any time by the receipt of a Wireless Power Signal 101, and transition nearly immediately into an RF listen state (including the various listen states described herein.) This feature of wake-on wireless energy detection is analogous to a hardware-based "wireless on-button."

Figure 6:
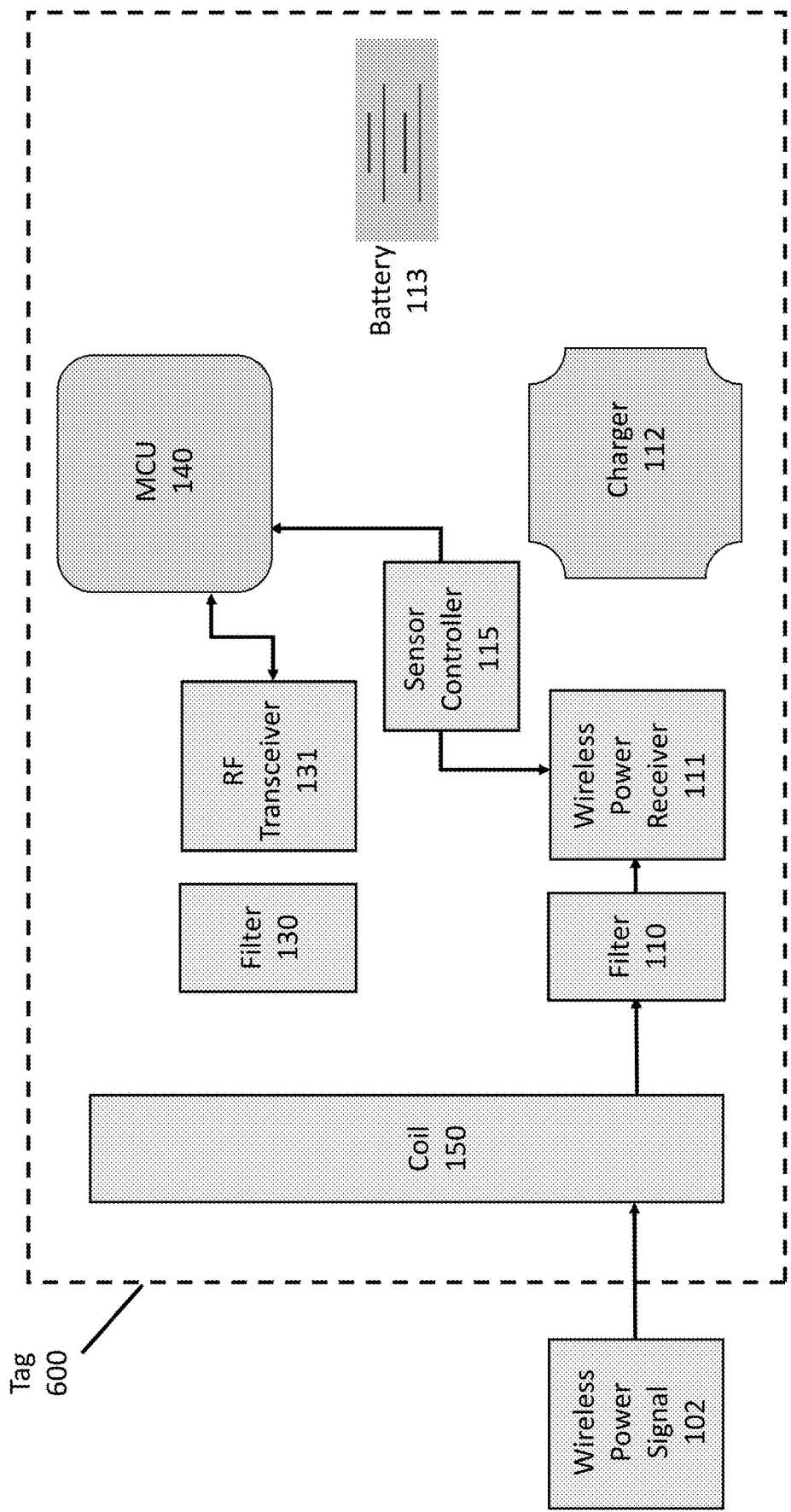
FIG. 6 illustrates an example embodiment of an asset monitoring and tracking device in a sleep state in the presence of a HF wireless power signal.

FIG. 6 illustrates an example embodiment of the wake-up on ID mode for Tag 600. Similar to the previous example embodiment, this example embodiment enables the system to awaken one or more specific Tags including in a cluster of Tags (e.g., a cluster of 10,000 Tags.) As in the example embodiment described above, Tag 600 may be affixed to an item in a freezer at −30 C for an extended period of time (e.g., 60 days.) Further to this example embodiment there is a need for Tag 600 to be responsive to an unplanned RF signal command in a timely manner (e.g., a 1 minute or less Tag response.) To conserve power, Tag 600 may be configured to be in an extremely low power state with RF Transceiver 131 in an inactive state across its duty cycle (e.g., 60 days) except for schedule daily or weekly status reporting. Thus, for most of the time in this example embodiment, the Tag 600 is in a sleep state using extremely low amounts of energy and generally unresponsive to signal request commands as described above. Further to this example embodiment, the Tag 600 is in a freezer with a plurality of Tags (e.g., thousands) affixed to various articles of interest. The Tag 600 is bound to a Tag identifier, for example a Tag key or unique number assigned during the manufacturing of Tag 600, prior to the Tag being placed into service, at a time the Tag 600 is placed in service, at a time the Tag 600 is associated with a given item, at a time the Tag 600 is detected by a certain wireless transceiver at a location, at a time the Tag is refurbished, etc. In a conventional cluster of Tags, if all Tags in proximity to a hub/gateway need to be generally responsive to unplanned requests from an associated Wireless Transceiver/Power Transmitter 900 (e.g., hub/gateway), all Tags need to periodically listen to determine if they are being called. The shorter the period between listening the more responsive the Tag but more power is consumed over a given period of time. As previously described, Tag listening may require an active RF Transceiver and Microcontroller both which consume relatively substantial amounts of power. While the previous example embodiment of FIG. 5 substantially reduces power even in a clustered Tag environment, unplanned Tag requests, even if only for a handful of Tags, may cause all Tags in the cluster to have to wake-up to see if they are being called. The following example embodiment provides a method and system to substantially reduce power consumption including in clustered Tag situations.

Returning to FIG. 6, a Sensor Controller 115, which comprises a microprocessor or microcontroller and an analog to digital voltage converter, is added to FIG. 5 (or Tag 100). The Sensor Controller 115 is coupled to Wireless Power Receiver 111 and MCU 140. The Sensor Controller 115 uses less power than various components of Tag 600 including MCU 140 and RF Transceiver 131. Optionally, the Sensor Controller 115 is a component of the MCU 140 and can be active independent of the MCU 140. In this example embodiment Tag 600 is in a restful or very low power state in which RF Sensor Controller 115, Transceiver 131, and MCU 140 are in a powered off state. Optionally, other Tags in proximity to Tag 600 are in a similarly very low power state. A wireless client (e.g., a hub/gateway) transmits a Wireless Power Signal 102 to Tag 600. The Wireless Power Signal 102, unlike Wireless Power Signal 101, is comprised of a pattern of on/off energy bursts and pauses of various lengths wherein the transmitted power signal pattern corresponds to an encoded identifier and is not intended to charge the battery. The power transmitting Wireless Power Signal 102 is received by Coil 150 which is coupled to Filter 110. Filter 110 passes the transmitting frequency (such as 6.78 MHz) and removes other unwanted frequencies. The Wireless Power Receiver 111 receives the Wireless Power Signal 102 and creates an analog voltage pattern which corresponds to the received Wireless Power Signal 102 and sends the analog voltage pattern to Sensor Controller 115. Sensor Controller 115, wakes up with an interrupt if asleep and decodes the received voltage pattern, for example using an OOK-decoder or other decoder known to those skilled in the art of encoding signals, to ascertain the encoded identifier in Wireless Power Signal 102. If the identifier corresponds to Tag's 600 identifier, the MCU 140 and RF Transceiver 131 are placed in an active listening state (including the various listen states described herein.) If the transmitted Tag identifier does not correspond to Tag's 600 identifier, the Sensor Controller 115 simply transitions to an off state. Advantageously, only those Tags of interest are responsive and come to attention while all others can remain at ease and, thereby, dramatically reducing power consumption in all Tags, including in a large cluster of Tags.

While the example embodiments above illustrates a wireless Tag wakeup technique from a shutdown or deep sleep mode, including in a Tag cluster, there are numerous other instances in which it would be advantageous for a Tag to be in a deep sleep mode or very low power state and to be awaken via a wireless power signal. In an example embodiment, it may be advantageous to manufacture a Tag outside the US and have finished Tags shipped directly to a US customer site. After manufacturer and test, Tags with a low amount of charge (e.g., for safety reasons) may be ocean shipped in a deep sleep state (and generally unresponsive to commands) to the customer site. Upon receipt at the customer site, Tags may be placed in storage for days or weeks. Using the techniques described herein, Tags can simply be placed in a wireless charging station a night before being placed into service. In the wireless charging station, each Tag may be brought out of their deep sleep state with the "wireless on button" described herein, provisioned with appropriate security features, software updated, and the battery topped off and be ready for active duty the following day.

Figure 7:
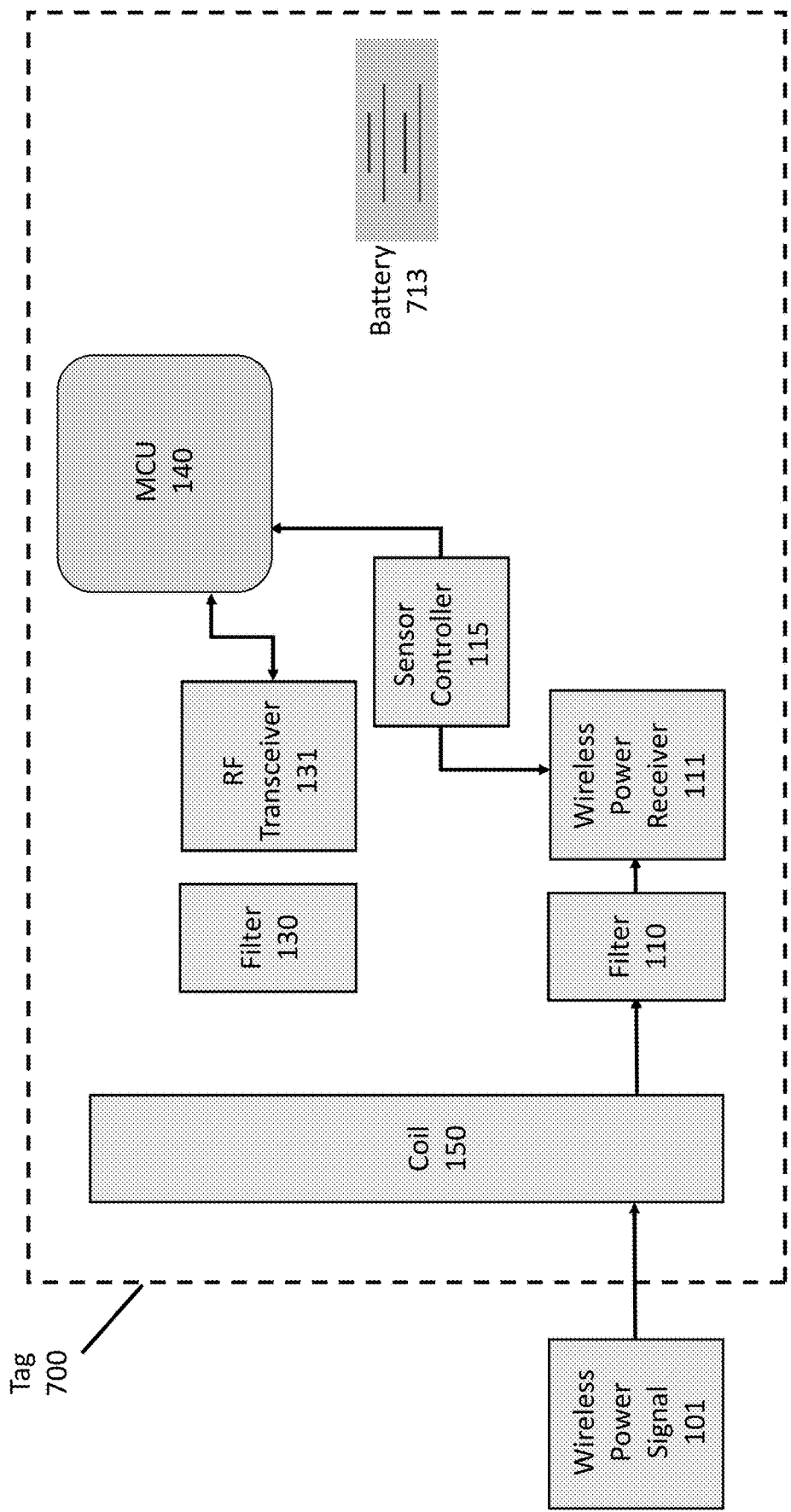
FIG. 7 illustrates an example embodiment of an asset monitoring and tracking device with a non-rechargeable power source.
Figure 8:
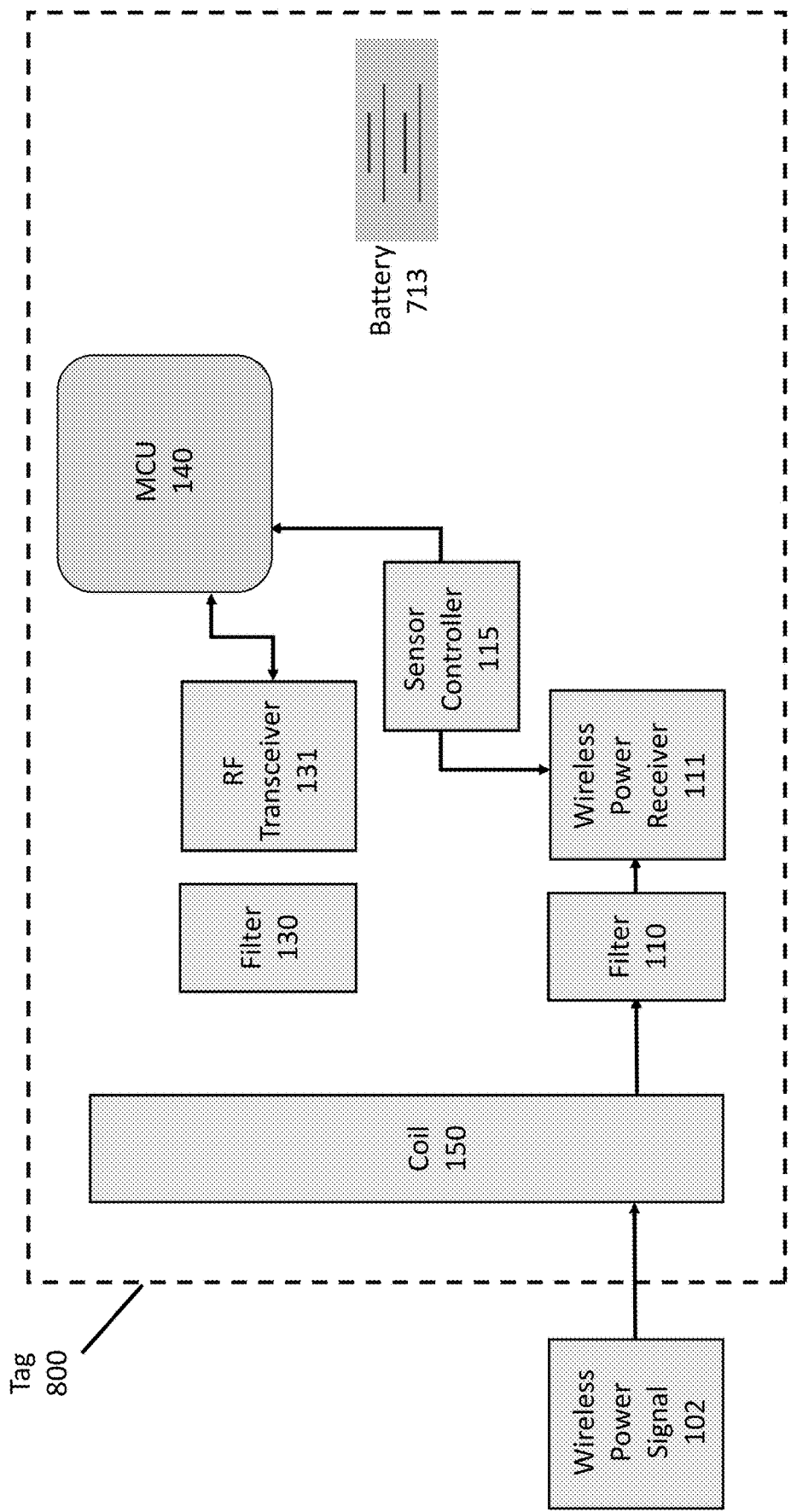
FIG. 8 illustrates an example embodiment of an asset monitoring and tracking device with a non-rechargeable power source.

The example embodiments above included a rechargeable Battery 113. The novel methods and systems described above can be applied to other embodiments in which a conventional Non-rechargeable Battery 713 including a non-rechargeable coin cell battery may be used. FIG. 7 is an example embodiment of a Tag 700 which does not include a rechargeable battery. The wake-up on energy detect mode described above with respect to Tag 100 may be used in this Non-rechargeable Battery 713 configuration of Tag 700. FIG. 8 is an example embodiment of a Tag 800 which does not include a rechargeable battery. The wake-up on energy detect with ID mode described above with respect to Tag 100 and Tag 600 can also be used in this Non-rechargeable Battery 713 configuration of Tag 800.

FIG. 9 illustrates a functional block diagram of an example embodiment Wireless Transceiver/Power Transmitter 900 (e.g. a Hub/Gateway) configured to be used with Tag 100-Tag 800 of FIGS. 1-8 to form a system. Optionally, the Wireless Transceiver/Power Transmitter 900 relays data and transacts command and control actions from one or more local or remote applications (e.g., an application running on a cloud-based server). Wireless Transceiver/Power Transmitter 900 comprises Micro Controller Unit (MCU) 920 coupled to RF Transceiver 951 and to Power Transceiver 941. Power Transceiver 941 and RF Signal Transmitter 951 are each coupled to Coil 980 via Filters 942 and 952, respectively. MCU 920 optionally interfaces with a network via a Network Interface 910. The Network Interface 910 comprises, for example, an Ethernet-based network interface connecting to a private network, a corporate network, a home network, etc., a Cellular-based network interface connecting to various public or private wireless cellular networks; a WiFi network interface; or other networks described herein, etc. In an example embodiment, MCU 920 and MCU 140 are the same microcontroller part(s), Filter 952 and Filter 130 are the same filter part(s), Filter 942 and Filter 110 are the same filter part(s), and Coil 980 and Coil 150 are the same coil part(s). Power Source 940 provides power to electronic components which comprise Wireless Transceiver/Power Transmitter 900. Power source 940 could for example be a USB power port, a battery pack (including rechargeable and non-rechargeable batteries), or an AC-to-DC power supply coupled to the electric grid.

In an example embodiment of Wireless Transceiver/Power Transmitter 900 (e.g. a Hub/Gateway) similar to that illustrated in FIG. 9 may include separately tuned coils/antennas a first for transmitting/receiving at ultra-high frequency (e.g., 915 MHz and 866) and a second for transmitting at a high frequency (e.g., 6.78 MHz) rather than a single Coil 980.

In another example embodiment the wireless transceiver portion is a separate physical unit from the power transmitter portion of FIG. 9 and can be used separately and/or in combination. In this example embodiment a first power transmitter unit comprises a coil/antenna, a wireless power transmitter, a MCU, and, optionally, a network interface. A second wireless transceiver unit comprises a coil/antenna, a wireless transceiver, a MCU, and, optionally, a network interface. Each unit is optionally powered by separate Power Source 940. In an example use case, for example, a stand-alone power transmitter may be configured only to "wake-up" a Tag as the Tag passes through an area (e.g., a corridor).

In another embodiment a Tag may be configured with a high frequency (e.g., 6.78 MHz) power transmitting circuit. Optionally, the configured Tag includes Power Transmitter 941 and Filter 942 and may share the use of Coil 150. Optionally, the configured Tag may use two separate coils/antennas.

Figure 10:
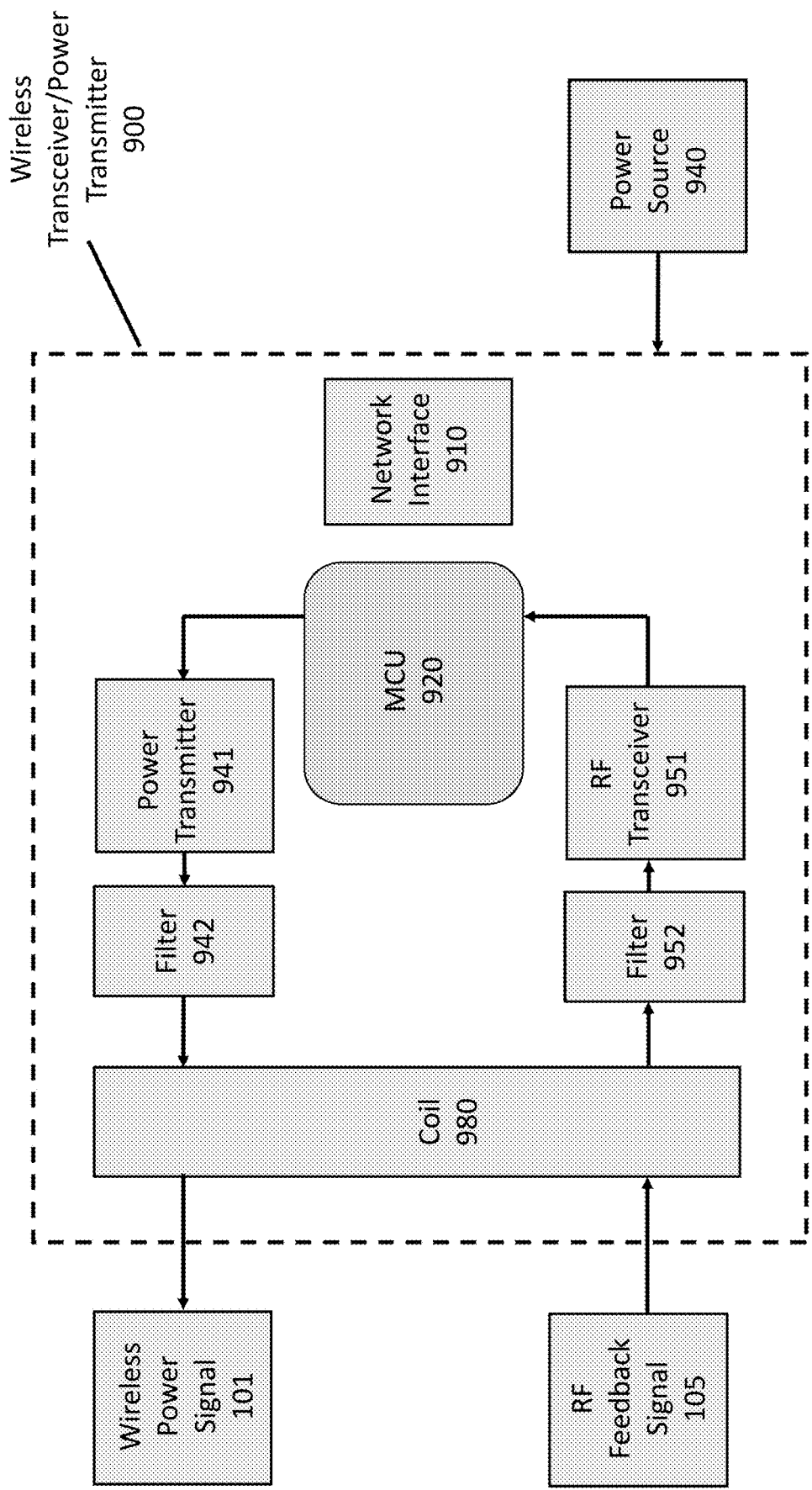
FIG. 10 illustrates an example embodiment of a wireless transceiver/power transmitter transmitting a HF power signal to an asset monitoring and tracking device and receiving a Tag UHF signal response.

There are five different operating modes for example embodiment Wireless Transceiver/Power Transmitter 900 which correspond to the five different operating modes of the here-to-for described Tags 100-800 and which will be designated as (1) charge mode, (2) radio transmit mode, (3) radio receive mode, (4) wake Tag mode, and (5) wake Tag with ID mode. It should be appreciated that despite the naming of the five modes as charge mode, radio transmit mode, radio receive mode, wake Tag mode, and wake Tag with ID mode for each of these modes is not limited only to the function described by the name of the mode. These five operating modes are illustrated in FIGS. 10, through 15 respectively. FIGS. 10 through 15 illustrate the same block diagrams that are illustrated in FIG. 9, except that unused system components and couplings are not shown and input signals are illustrated as appropriate for the operating mode being discussed.

Coil 980 may comprise a trace on a PCB such as is typically used by resonant power transmission devices. FIG. 9 illustrates a common Coil 980 used for both wireless power transmission and RF signal transmission/reception; however, separate coils may also be used for each of these two functions. Optionally, RF signal transmission/reception is configured in a range between 800 MHz and 1 GHz. Optionally, wireless power transmission is configured in a range between 5 MHz and 20 MHz. In an example embodiment Coil 980 is tuned to a transmission/reception radio frequency of 915 MHz or 866 MHz and a wireless power transmission frequency of 6.78 MHz.

Filters 942 and 952 simultaneously allow RF signal transmission/reception and wireless power transmission through Coil 980 by filtering out frequencies of the opposing function. For example, if wireless power transmission occurs at 6.78 MHz and the RF transmission occurs at 915 MHz, Filter 942 will filter out 915 MHz and pass 6.78 MHz while Filter 952 will filter out 6.78 MHz and pass 915 MHz.

FIG. 10 illustrates charge mode for Wireless Transceiver/Power Transmitter 900. Power Transmitter 941 transmits resonant wireless power through Coil 980 at a frequency below 10 MHz, for example at 6.78 MHz. Power Transmitter 941 transmits Wireless Power Signal 101 through Coil 980 but also uses Coil 980 to receive RF Feedback Signal 105 as a modulated signal. RF Feedback Signal 105 may contain information about end-of-charge cycle for a rechargeable battery in a Tag 100. The information contained in RF Feedback Signal 105 is sent to MCU 920 via Filter 952 and RF Transceiver 951. In another example embodiment, as similarly described in FIG. 10, Wireless Transceiver/Power Transmitter 900 may transmit a Wireless Power Signal 102 which is comprised of a pattern of on/off energy bursts and pauses of various lengths wherein the signal pattern corresponds to an encoded identifier.

Figure 11:
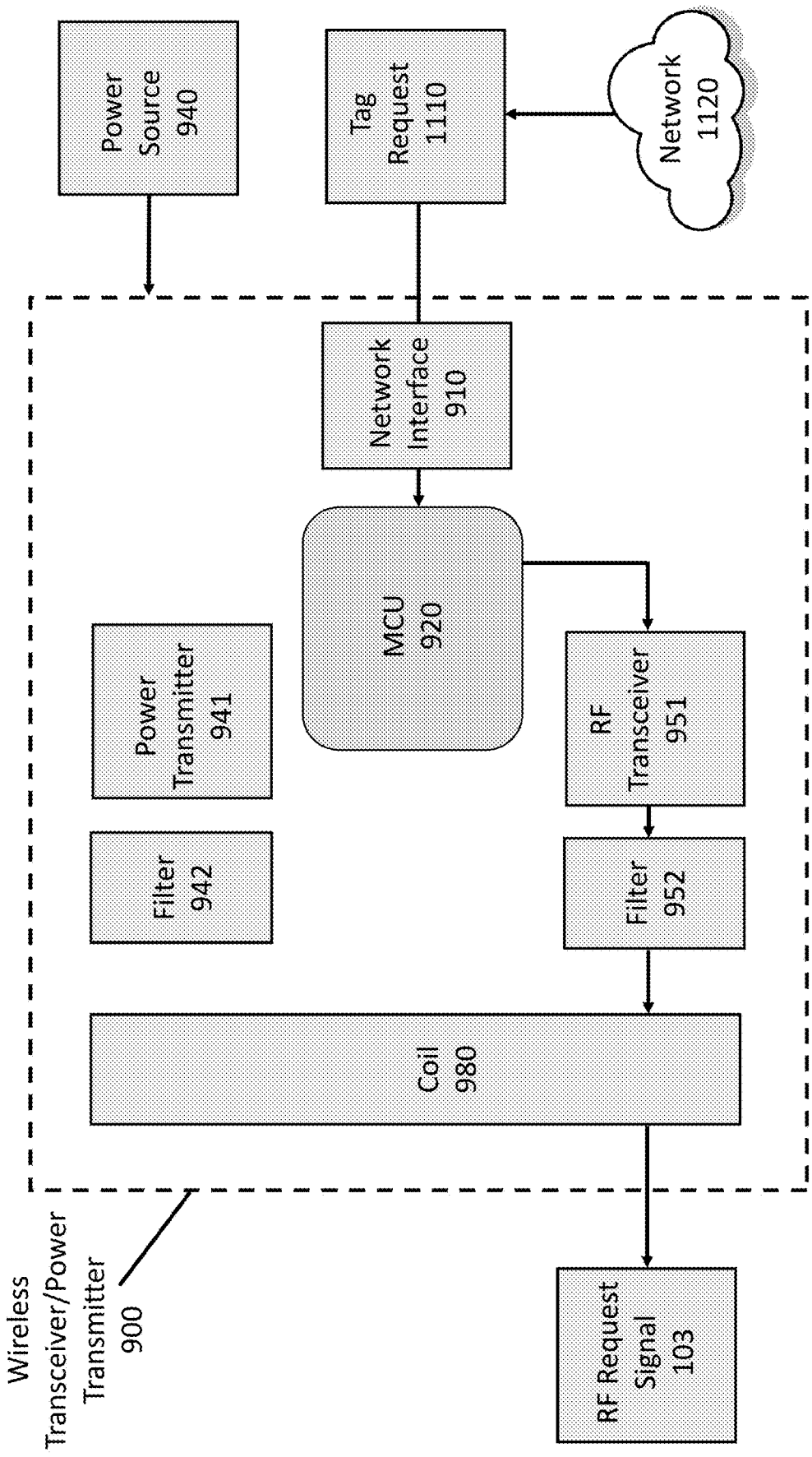
FIG. 11 illustrates an example embodiment of a wireless transceiver/power transmitter transmitting a UHF signal to an asset monitoring and tracking device wherein a request to transmit the UHF signal originated over a network.

FIG. 11 illustrates radio transmit mode in which the Wireless Transceiver/Power Transmitter 900 is initiating an information request to Tag 100. (The Wireless Transceiver/Power Transmitter 900, in manner similarly described herein but not shown in the Figures, may make a Tag Request 1110 for Tags 600-800.) In an example embodiment MCU 920 receives a request, Tag Request 1110 via Network Interface 910 from a remote server (e.g., a cloud-based computing server) over a network 1120 (e.g., a private, corporate network, cellular network, Internet, etc.) to query information regarding a specific Tag. MCU 920 formats the request and passes the request to RF Transceiver 951 which modulates the electrical signal and transmits a corresponding transmission signal via Filter 952 and Coil 980 as RF Request Signal 103.

Figure 12:
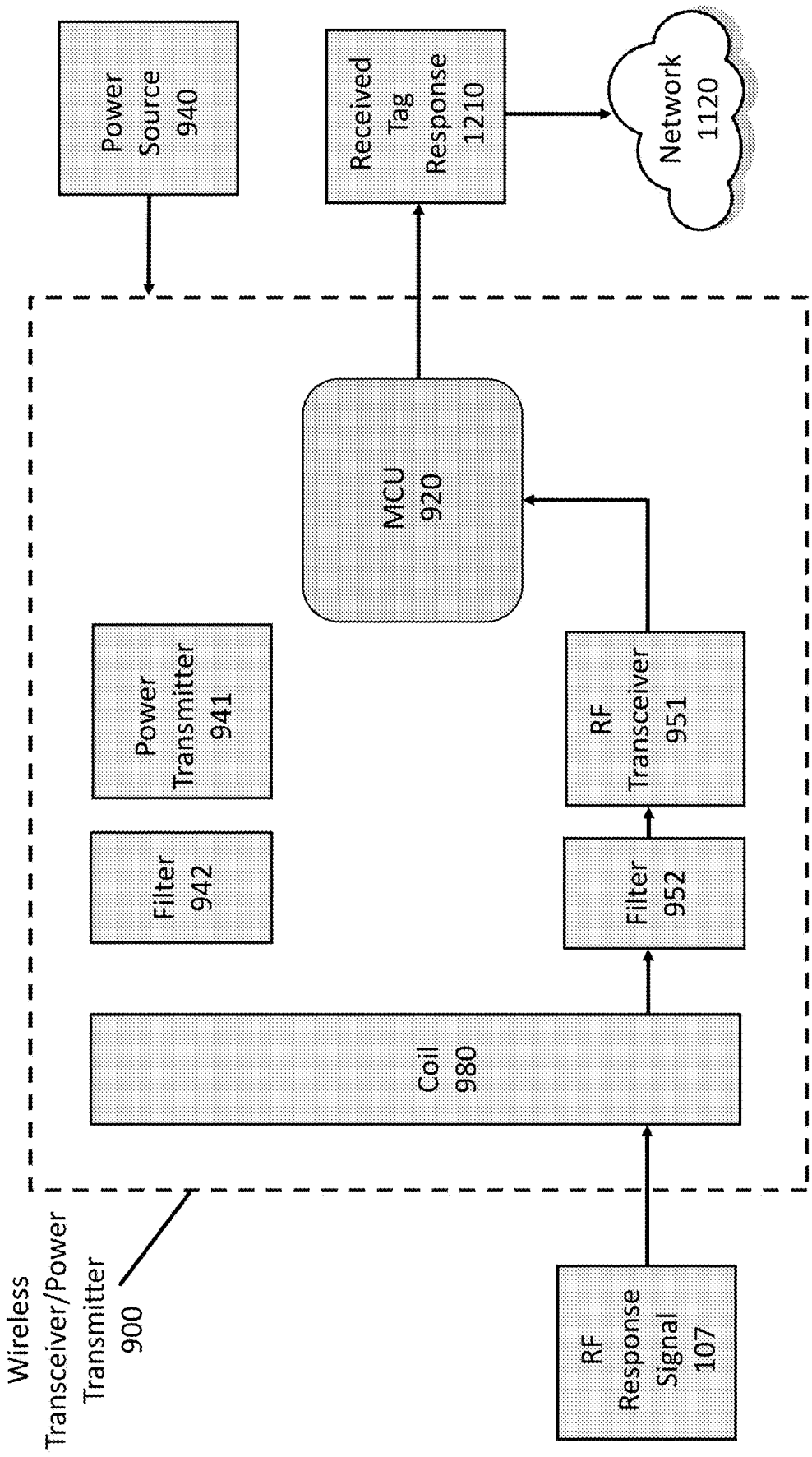
FIG. 12 illustrates an example embodiment of a wireless transceiver/power transmitter receiving a UHF signal from an asset monitoring and tracking device and relaying over a network the received Tag data.

FIG. 12 illustrates radio receive mode in which RF Response Signal 107 is received by Coil 980, filtered by Filter 952, demodulated by RF Transceiver 951, and then sent to MCU 920. MCU 920 transmits the demodulated signal as a Received Tag Response 1210 via a Network Interface 910 using a Network 1120 (e.g., a private, corporate network, cellular network, Internet, etc.) to a cloud computing platform server(s) or one or more network-based corporate servers.

Figure 13:
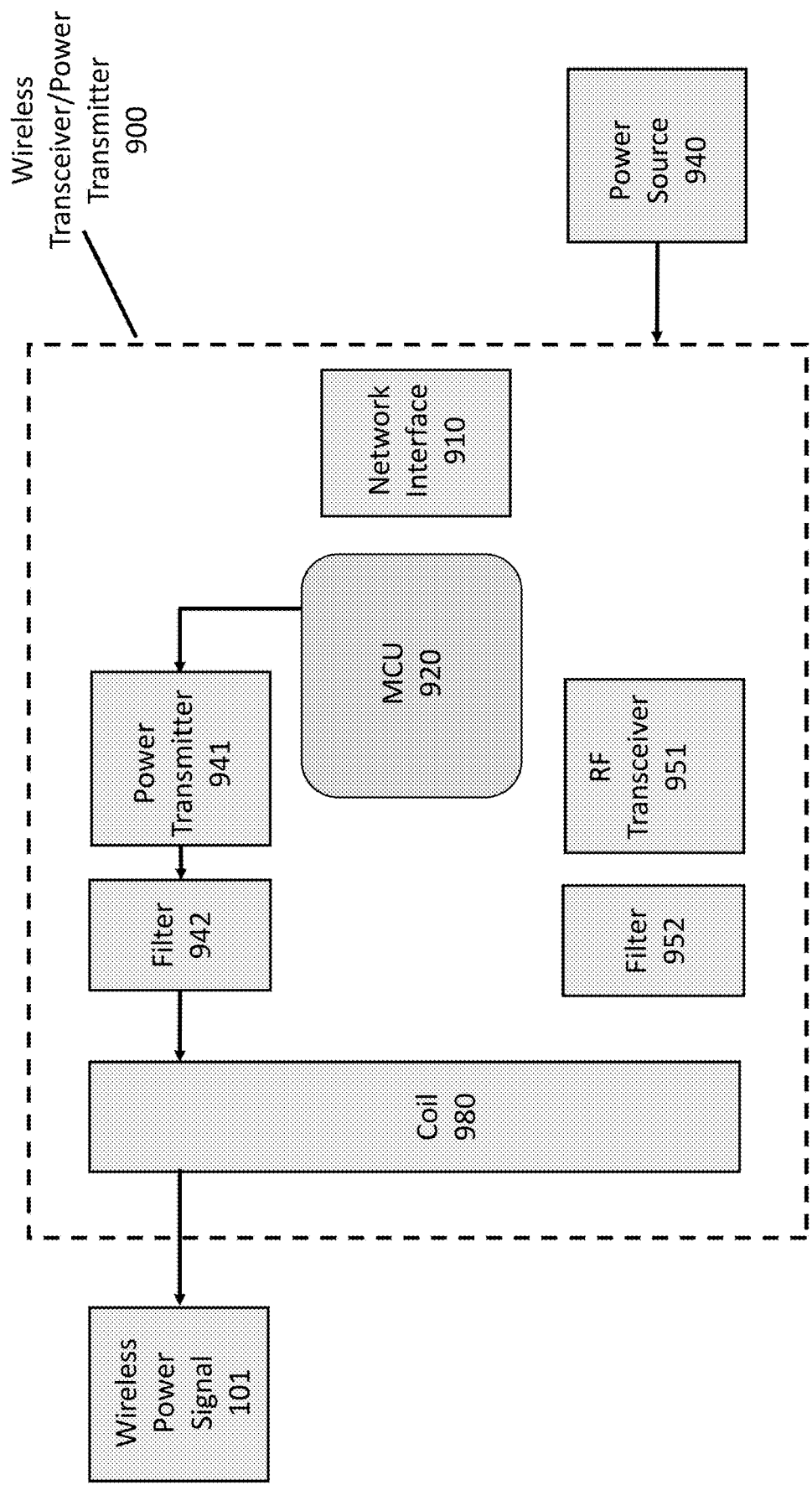
FIG. 13 illustrates an example embodiment of a wireless transceiver/power transmitter transmitting a HF power signal.

FIG. 13 illustrates wake Tag mode for Wireless Transceiver/Power Transmitter 900. In this example embodiment the Wireless Power Transmitter 900 transmits a HF Signal 101 to awaken one or more Tags which may be in a restful, low power, or very low power sleep mode. Power Transmitter 941, under control of MCU 920, transmits resonant wireless power through Coil 980 at a frequency below 10 MHz, for example at 6.78 MHz, optionally, for a brief duration.

Figure 14:
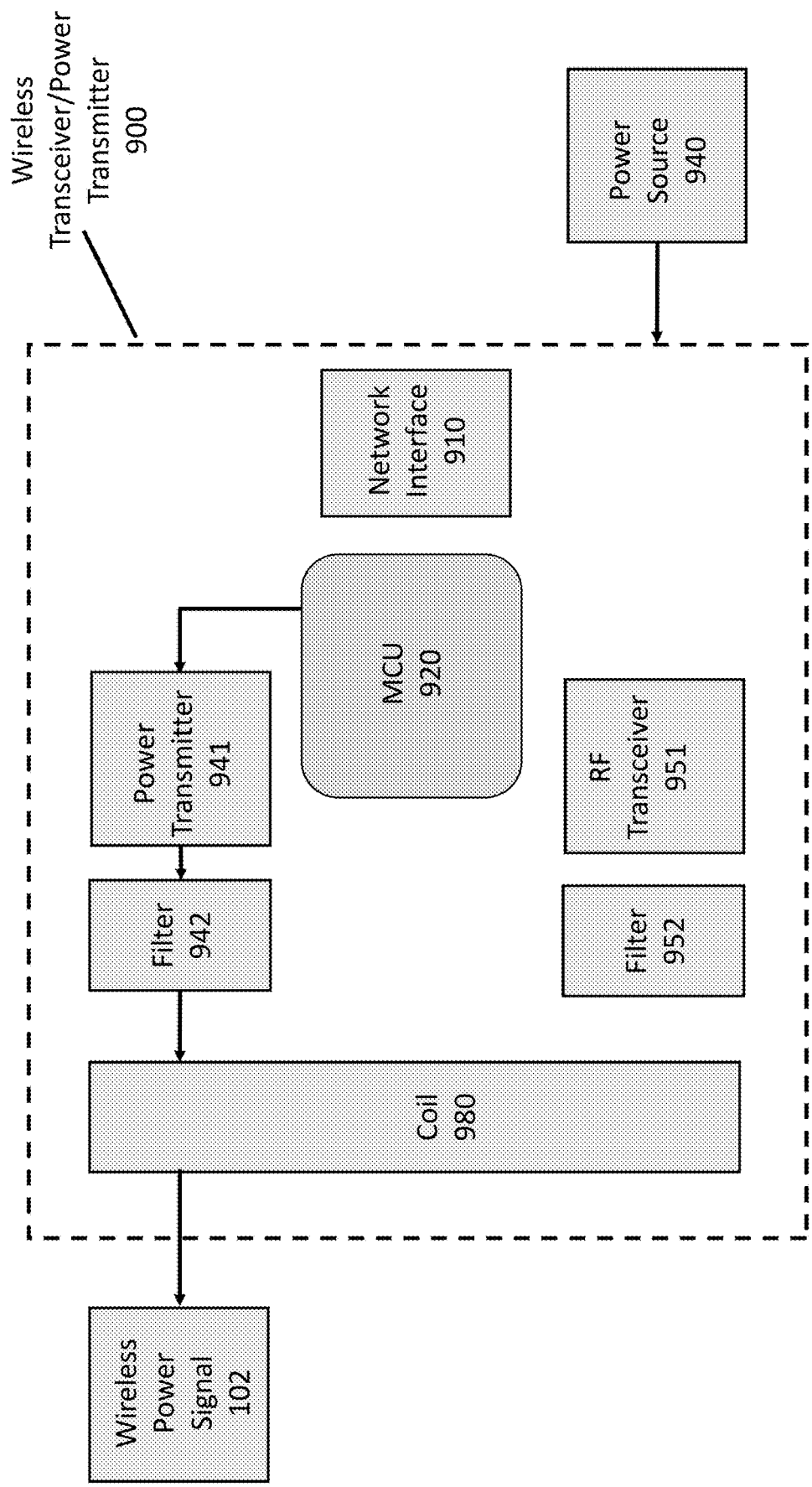
FIG. 14 illustrates an example embodiment of a wireless transceiver/power transmitter transmitting a HF power signal pattern.

FIG. 14 illustrates wake Tag with ID mode for Wireless Transceiver/Power Transmitter 900. In this example embodiment the Wireless Power Transmitter 900 transmits a HF Signal 102 which is comprised of an on/off energy signal pattern of various durations wherein the signal pattern corresponds to an encoded identifier. As described herein above, the HF Signal 102 causes one or more Tags which correspond to the encoded identifier to awaken from a restful, low power or very low power sleep mode to wake-up. Tags which receive the HF Signal 102 Power Transmitter 941, under control of MCU 920, transmits resonant wireless power signal pattern through Coil 980 at a frequency below 10 MHz, for example at 6.78 MHz.

Although the present invention and its advantages have been described in detail, it should be understood that various changes, substitutions and alterations can be made herein without departing from the spirit and scope of the invention as defined by the appended claims. For example, many of the processes discussed above can be implemented in different methodologies and replaced by other processes, or a combination thereof. As another example, other forms of signal modulation could be used instead of frequency modulation. Moreover, the scope of the present application is not intended to be limited to the particular embodiments of the process, machine, manufacture, composition of matter, means, methods, and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention.

Conditional language used herein, such as, among others, "can," "may," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without other input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

While the above detailed description has shown, described, and pointed out novel features as applied to various embodiments, it can be understood that various omissions, substitutions, and changes in the form and details of the devices illustrated can be made without departing from the spirit of the disclosure. As can be recognized, certain embodiments described herein can be embodied within a form that does not provide all of the features and benefits set forth herein, as some features can be used or practiced separately from others. The scope of certain embodiments disclosed herein is indicated by the appended claims rather than by the foregoing description. All changes which come within the meaning and range of equivalency of the claims are to be embraced within their scope.

The invention claimed is:

1. A radio identification system, comprising:
   a first computing device configured to emit an information radio signal and a wireless power signal;
   a second computing device comprising a first antenna tuned to receive the information radio signal, a radio frequency transceiver, a second antenna tuned to receive the wireless power signal, a wireless power receiver, a sensor controller configured with an analog-to-digital converter, and a microcontroller,
      wherein the sensor controller converts analog voltage patterns to a digital form;
   non-transitory media storing instructions readable by the radio identification system, that when executed by the radio identification system, cause the radio identification system to:
      transmit, by the first computing device, a plurality of wireless power signals;
      receive, at the second antenna of the second computing device, the plurality of wireless power signals;
      harvest, by the wireless power receiver associated with the second antenna, energy from the received plurality of wireless power signals;
      determine, by the sensor controller, an identifier corresponding to an energy pattern of a combination of the received plurality of wireless power signals and
      if the identifier matches an identifier associated with the second computing device, initiate a sensor controller interrupt instruction to the microcontroller to transition the microcontroller from a sleep state into a power consuming state wherein the microcontroller in the power consuming state is configured to receive the information radio signal.

2. The radio identification system of claim 1, the radio identification system further configured to:
   transmit, by the first computing device, an information radio signal;
   receive, at the first antenna and associated radio frequency transceiver of the second computing device, the transmitted information radio signal of the first computing device; and
   store in computer memory, by the microcontroller of the second computing device, at least a portion of the information transmitted in the received information signal.

3. The radio identification system of claim 1, the radio identification system further comprising:
if the identifier does not match an identifier associated with the second computing device, the sensor controller does not initiate the interrupt instruction to the microcontroller to transition the microcontroller from a sleep state into a power consuming state.

4. The radio identification system of claim 1, wherein the microcontroller sleep state is a state in which the microcontroller is consuming no power or very low power as compared to a non-sleep state.

5. The radio identification system of claim 1, wherein the second antenna is tuned to resonate with the wireless power signal wherein the wireless power signal is a radio frequency or band of frequencies less than 10 MHz and wherein the first antenna is further tuned to resonate with the information radio signal wherein the information radio signal is a radio frequency or band of frequencies in the 850-950 MHz band.

6. The radio identification system of claim 1, wherein the radio identification system comprises a plurality of second computing devices within radio communication range of the first computing device and wherein the plurality of second computing devices is greater than a thousand.

7. The radio identification system of claim 1, wherein the radio identification system comprises a plurality of second computing devices within radio communication range of the first computing device and, wherein each second computing device has an identifier, and wherein at least a portion or portions of the plurality of second computing devices have the same identifier.

8. The radio identification system of claim 1, wherein the radio identification system comprises a plurality of second computing devices within radio communication range of the first computing device and, wherein each second computing device has a unique identifier.

9. The radio identification system of claim 1, wherein the first computing device comprises a computing device which is configured to emit the information radio signal and a separate computing device configured to emit the wireless power signal.

10. A radio identification system, comprising:
a first computing device configured to emit an information radio signal and a wireless power signal;
a second computing device comprising an antenna tuned to receive the information radio signal and the wireless power signal, a radio frequency transceiver, a wireless power receiver with an associated sensor controller, the sensor controller further configured with an analog-to-digital converter, and a microcontroller, and
wherein the sensor controller converts analog voltage patterns to a digital form, and
wherein the antenna is coupled with a first filter which is configured to pass the wireless power signal to the wireless power receiver, and
wherein the antenna is coupled with a second filter which is configured to pass the information radio signal to the radio frequency transceiver;
non-transitory media storing instructions readable by the radio identification system, that when executed by the radio identification system, cause the radio identification system to:
transmit, by the first computing device, a plurality of wireless power signals;
receive, at the antenna of the second computing device, the plurality of wireless power signals;
harvest, by the wireless power receiver associated with the antenna, energy from the received plurality of wireless power signals;
determine, by the sensor controller, an identifier corresponding to an energy pattern of a combination of the received plurality of wireless power signals and
if the identifier matches an identifier associated with the second computing device, initiate a sensor controller interrupt instruction to the microcontroller to transition the microcontroller from a sleep state into a power consuming state wherein the microcontroller in the power consuming state is configured to receive the information radio signal.

11. The radio identification system of claim 10, the radio identification system further configured to:
transmit, by the first computing device, an information radio signal;
receive, at the antenna and associated radio frequency transceiver of the second computing device, the transmitted information radio signal of the first computing device; and
store in computer memory, by the microcontroller of the second computing device, at least a portion of the information transmitted in the received information signal.

12. The radio identification system of claim 10, the radio identification system further comprising:
if the identifier does not match an identifier associated with the second computing device, the sensor controller does not initiate the interrupt instruction to the microcontroller to transition the microcontroller from a sleep state into a power consuming state.

13. The radio identification system of claim 10, wherein the antenna is tuned to resonate with the wireless power signal wherein the wireless power signal is a radio frequency or band of frequencies less than 10 MHz and wherein the antenna is further tuned to resonate with the information radio signal wherein the information radio signal is a radio frequency or band of frequencies in the 850-950 MHz band.

14. The radio identification system of claim 10, wherein the radio identification system comprises a plurality of second computing devices within radio communication range of the first computing device and wherein each of the plurality of second computing devices has a unique identifier.

15. The radio identification system of claim 10, wherein the radio identification system comprises a plurality of second computing devices within radio communication range of the first computing device and, wherein each second computing device has an identifier, and wherein a portion or portions of the plurality of second computing devices have the same identifier.

16. A radio identification system, comprising:
a computing device comprising an antenna tuned to receive an information radio signal and a wireless power signal, a radio frequency transceiver, a wireless power receiver with an associated a sensor controller, the sensor controller further configured with an analog-to-digital converter, and a microcontroller,
wherein the sensor controller converts analog voltage patterns to a digital form, and
wherein the antenna is coupled with a first filter which is configured to pass wireless power signals to the wireless power receiver, and
wherein the antenna is couple with a second filter which is configured to pass information radio signals to the radio frequency transceiver;

non-transitory media storing instructions readable by the radio identification system, that when executed by the radio identification system, cause the radio identification system to:
- receive, at the antenna of the computing device, a plurality of wireless power signals;
- harvest, by the wireless power receiver associated with the antenna, energy from the received plurality of wireless power signals;
- determine, by the sensor controller, an identifier corresponding to an energy pattern of a combination of the received plurality of wireless power signals and
- if the identifier matches an identifier associated with the computing device, initiate a sensor controller interrupt instruction to the microcontroller to transition the microcontroller from a sleep state into a power consuming state wherein the microcontroller in the power consuming state is configured to receive the information radio signal.

17. The radio identification system of claim 16, the radio identification system further configured to:
- receive, at the antenna and associated radio frequency transceiver of the computing device, a transmitted information radio signal; and
- store in computer memory, by the microcontroller of the computing device, at least a portion of the information transmitted in the received information signal.

18. The radio identification system of claim 16, the radio identification system further comprising:
- if the identifier does not match an identifier associated with the computing device, the sensor controller does not initiate the interrupt instruction to the microcontroller to transition the microcontroller from a sleep state into a power consuming state.

19. The radio identification system of claim 16, wherein the antenna is tuned to resonate with the wireless power signal wherein the wireless power signal is a radio frequency or band of frequencies less than 10 MHz and wherein the antenna is also tuned to resonate with the information radio signal wherein the information radio signal is a radio frequency or band of frequencies in the 850-950 MHz band.

20. The radio identification system of claim 16, wherein the first filter is configured to pass a wireless power signal to the wireless power receiver at a radio frequency or band of frequencies less than 10 MHz and wherein the second filter is configured to pass a wireless power signal to the wireless power receiver at a radio frequency or band of frequencies in the 850-950 MHz band.

\* \* \* \* \*